(12) United States Patent
Muth

(10) Patent No.: US 10,753,711 B2
(45) Date of Patent: Aug. 25, 2020

(54) HINGED BALLISTIC RESISTANT PANEL

(71) Applicant: Glenroy, Inc., Menomonee Falls, WI (US)

(72) Inventor: James C. Muth, Hustisford, WI (US)

(73) Assignee: Glenroy, Inc., Menomonee Falls, WI (US)

(*) Notice: Subject to any disclaimer, the term of this patent is extended or adjusted under 35 U.S.C. 154(b) by 0 days.

(21) Appl. No.: 16/413,304

(22) Filed: May 15, 2019

(65) Prior Publication Data
US 2019/0353465 A1 Nov. 21, 2019

Related U.S. Application Data

(60) Provisional application No. 62/674,303, filed on May 21, 2018.

(51) Int. Cl.
*F41H 5/24* (2006.01)
*B60B 33/00* (2006.01)
*E05D 3/02* (2006.01)
*F41H 5/14* (2006.01)

(52) U.S. Cl.
CPC ............ *F41H 5/24* (2013.01); *B60B 33/0002* (2013.01); *E05D 3/02* (2013.01); *F41H 5/14* (2013.01)

(58) Field of Classification Search
CPC .......... F41H 5/14; B60B 33/0002; E05D 3/02
USPC ....................................................... 89/36.09
See application file for complete search history.

(56) References Cited

U.S. PATENT DOCUMENTS

| | | | | |
|---|---|---|---|---|
| 2,986,746 A | * | 6/1961 | Jackson | B60B 33/0002 5/8 |
| 3,590,685 A | * | 7/1971 | Lane | F41H 5/14 89/36.09 |
| 7,980,166 B1 | * | 7/2011 | Fuqua | F41H 5/08 86/50 |
| 8,015,910 B1 | * | 9/2011 | Fuqua | F41H 5/14 89/36.01 |
| 8,276,499 B1 | * | 10/2012 | Fuqua | F41H 5/14 89/36.09 |
| 8,555,770 B2 | * | 10/2013 | Fuqua | B60R 3/005 182/129 |
| 10,281,245 B2 | * | 5/2019 | DeKort | F41H 5/08 |
| 2010/0043629 A1 | * | 2/2010 | Carberry | F41H 5/24 89/36.02 |
| 2010/0326001 A1 | * | 12/2010 | Herron | E04B 2/12 52/576 |
| 2011/0011255 A1 | * | 1/2011 | Kleniatis | F41H 5/08 89/36.09 |
| 2012/0174768 A1 | * | 7/2012 | Spransy | F41H 5/14 89/36.09 |
| 2018/0073841 A1 | * | 3/2018 | DeKort | F41H 5/24 |
| 2019/0353465 A1 | * | 11/2019 | Muth | E05D 7/1005 |
| 2019/0360782 A1 | * | 11/2019 | Blackburn | G08B 5/36 |
| 2020/0025525 A1 | * | 1/2020 | Spransy | F41H 5/14 |

FOREIGN PATENT DOCUMENTS

EP 3581874 A1 * 12/2019 ............... F41H 5/08

* cited by examiner

*Primary Examiner* — Samir Abdosh
(74) *Attorney, Agent, or Firm* — Nicholas A. Kees; Godfrey & Kahn, S.C.

(57) ABSTRACT

A movable ballistic resistant panel includes ballistic resistant leaf hinges that allow multiple panels to be attached to each other to form an openable and movable barrier capable of numerous different configurations.

20 Claims, 25 Drawing Sheets

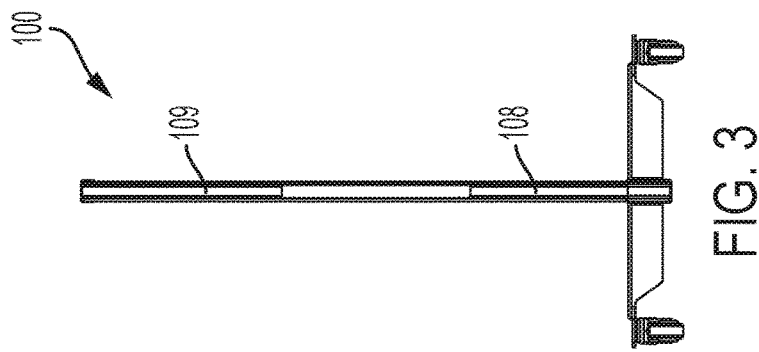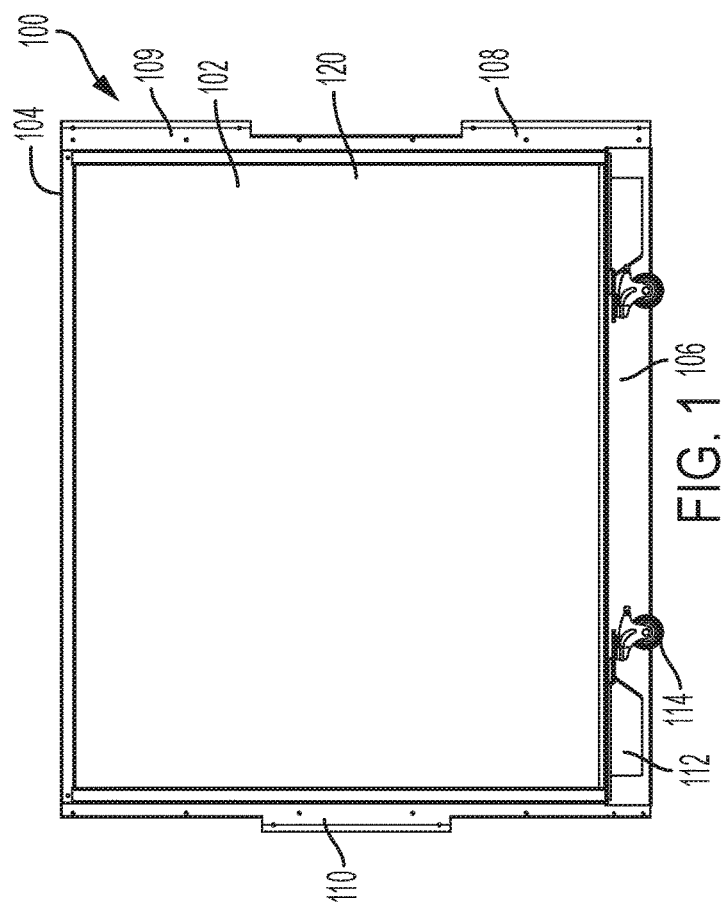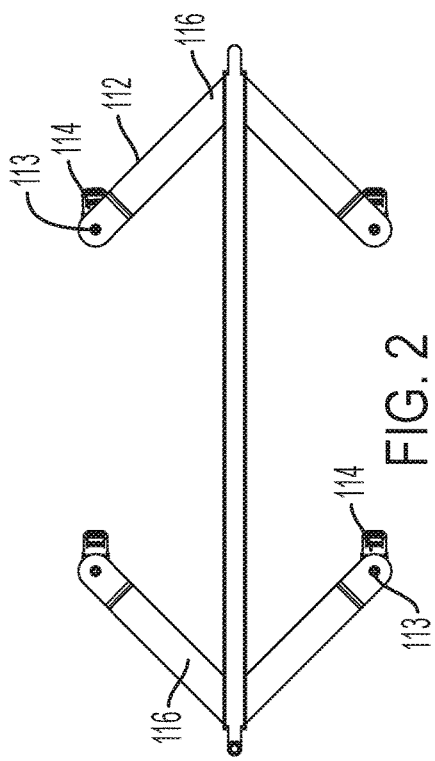

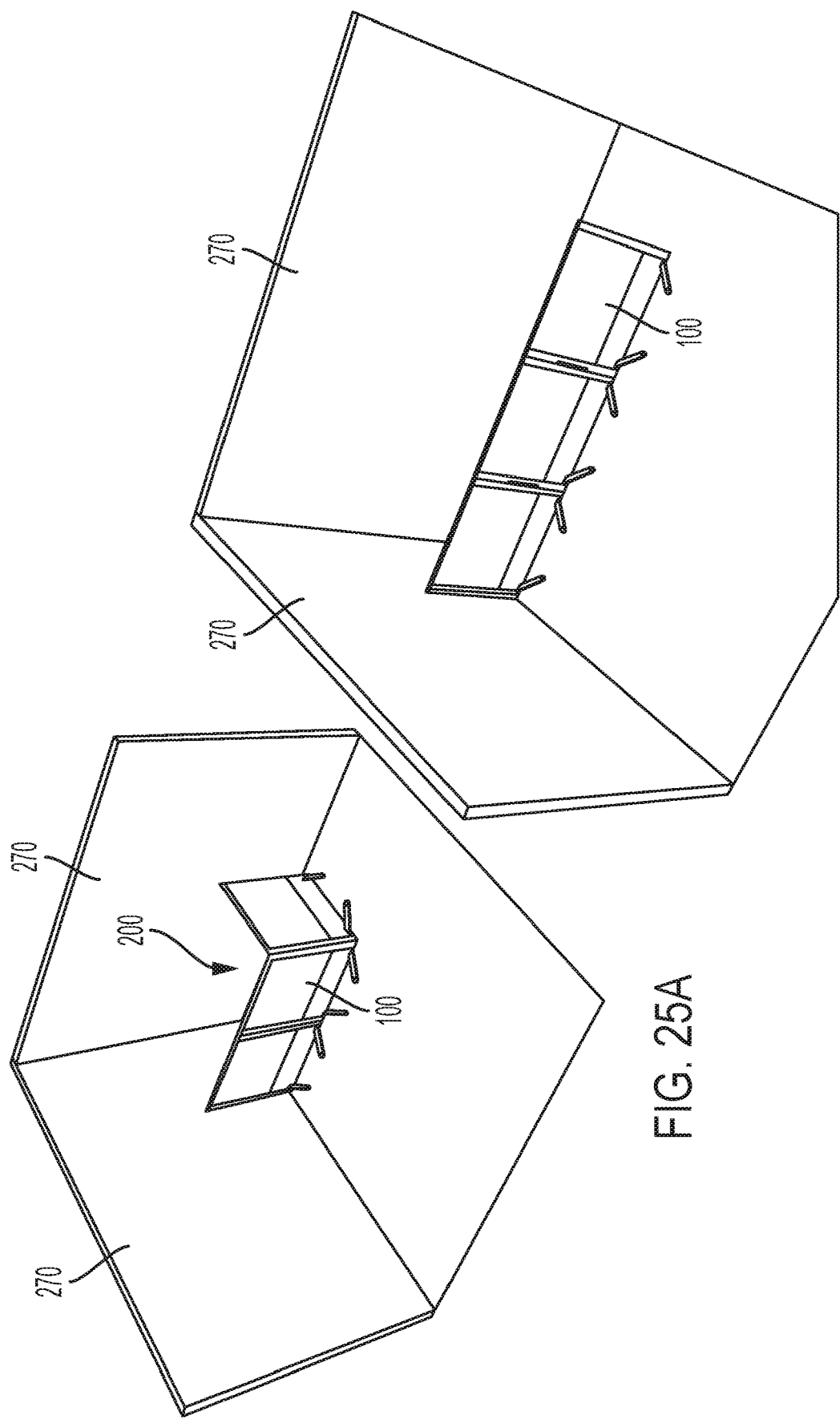

HINGED BALLISTIC RESISTANT PANEL

CROSS REFERENCE TO RELATED APPLICATION

This application is based on and claims priority to U.S. Provisional Patent Application No. 62/674,303 filed on May 21, 2018, which is incorporated herein by reference in its entirety for all purposes.

FIELD OF THE INVENTION

The present invention relates generally to the field of ballistic armor. More particularly, the present invention relates to movable ballistic resistant panel assembly including at least two panels rotatably attached to each other by at least one ballistic resistant hinge.

BACKGROUND

In recent years, there has been an increase in the number of active shooter type attacks, with over 275 occurring in the United States between 2000 and 2018. During that period, over 800 people were killed and nearly 1,500 were wounded by active shooters. Of those active shooter incidents, a very high percentage occurred in schools, businesses, and other public places. Concurrently, construction techniques used to build schools and similar buildings have shifted from a traditional concrete block construction for not only exterior walls but also interior walls, to a less expensive form of construction using studs and drywall. While newer construction methods have many advantages over concrete block construction, they do not provide the same level of protection against active-shooter attacks as concrete block, which is significantly more robust than studs and drywall.

The Department of Homeland Security lists three accepted reactions to active shooter attacks, which are often taught to students, faculty, and administrators. The first and most desirable response is to evacuate if there is an accessible escape path. If no such path is available, the next most desirable response is to "shelter-in-place" or "hide out" where the active shooter is unlikely find that individual. The third, least desirable response is to take action against the active shooter. This should only be used as a last resort, when that individual's life is in imminent danger.

The Department of Homeland Security offers the following instructions for sheltering in place: find a hiding place that (1) is out of the active shooter's point of view, (2) provides protection if shots are fired in the direction of the hiding place (i.e., an office with a closed and locked door), and (3) does not trap the individual or restrict the individual's movement options. If the active shooter is nearby, the following recommendations apply: (1) lock the door, (2) silence cell phone and/or pager, (3) turn off any source of noise, (4) hide behind large items (i.e., cabinets, desks), and (4) remain quiet.

There are products available to fortify a building by integrating ballistic barriers into furniture, millwork, walls, and doors. However, those solutions are expensive and often require significant construction investment to implement.

One of the most important elements to finding a safe place to shelter in place is to hide in as secure a place as possible. However, as described above, particularly in newer schools, even if people were to hide in a locked classroom, bullets could potentially penetrate the door, walls, and/or windows. Movable barriers have been developed that provide some protection, while also serving as whiteboards, corkboards, or other useful things, but the current solutions are not able to be combined into a continuous barrier that may be configured to form a hiding spot that, with the exception of a roof, is completely cut off from the rest of the room.

As such, there is a need for a movable barrier that can be deployed quickly to create a protected area from an active shooter that either enters the room or fires through windows and/or walls.

SUMMARY

The present invention relates to a ballistic resistant panel. The ballistic resistant panel includes a section made of ballistic resistant material, a plurality of legs, each leg attached at a first end to the panel. A caster may optionally be attached to a second end of each leg. A plurality of leaves are attached to the panel, wherein an upper leaf and a lower leaf are attached to a first end of the panel, and a middle leaf is attached to a second end of the panel. The upper and middle leaves are hollow and contain hinge pins. The hinge pins can move between a retracted position and an extended position so the hinge pins can selectively engage leaves on adjacent ballistic resistant panels. Since the lower leaf is only partially hollow, a hinge pin can rest on the solid portion of the lower leaf when the hinge pin is extended into the lower leaf, thereby supporting the hinge pins when they are extended.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 1 is a front elevation view of one embodiment of a hinged ballistic resistant panel in accordance with the invention;

FIG. 2 is a top view of the hinged ballistic resistant panel shown in FIG. 1;

FIG. 3 is a side elevation view of the hinged ballistic resistant panel shown in FIG. 1;

FIG. 25A is a perspective schematic view of a room showing a barrier using the hinged ballistic resistant panel of FIG. 1;

FIG. 25B is another perspective schematic view of the room showing one panel of the barrier positioned to provide a path to a secure space behind the barrier;

DETAILED DESCRIPTION

Figure 4:
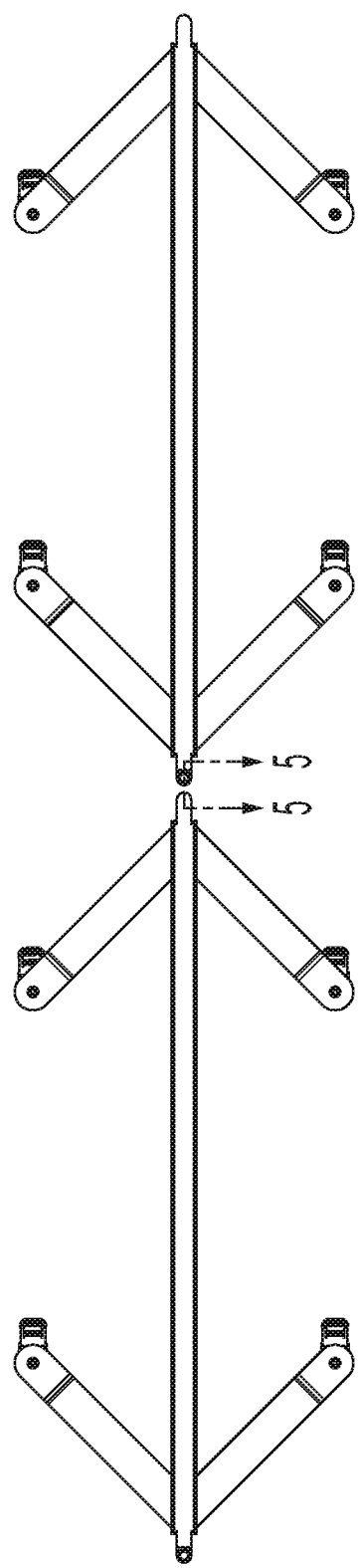
FIG. 4 is a top view of two hinged ballistic resistant panels shown in FIG. 1, showing the ballistic resistant panels in a disassembled configuration.
Figure 4A:
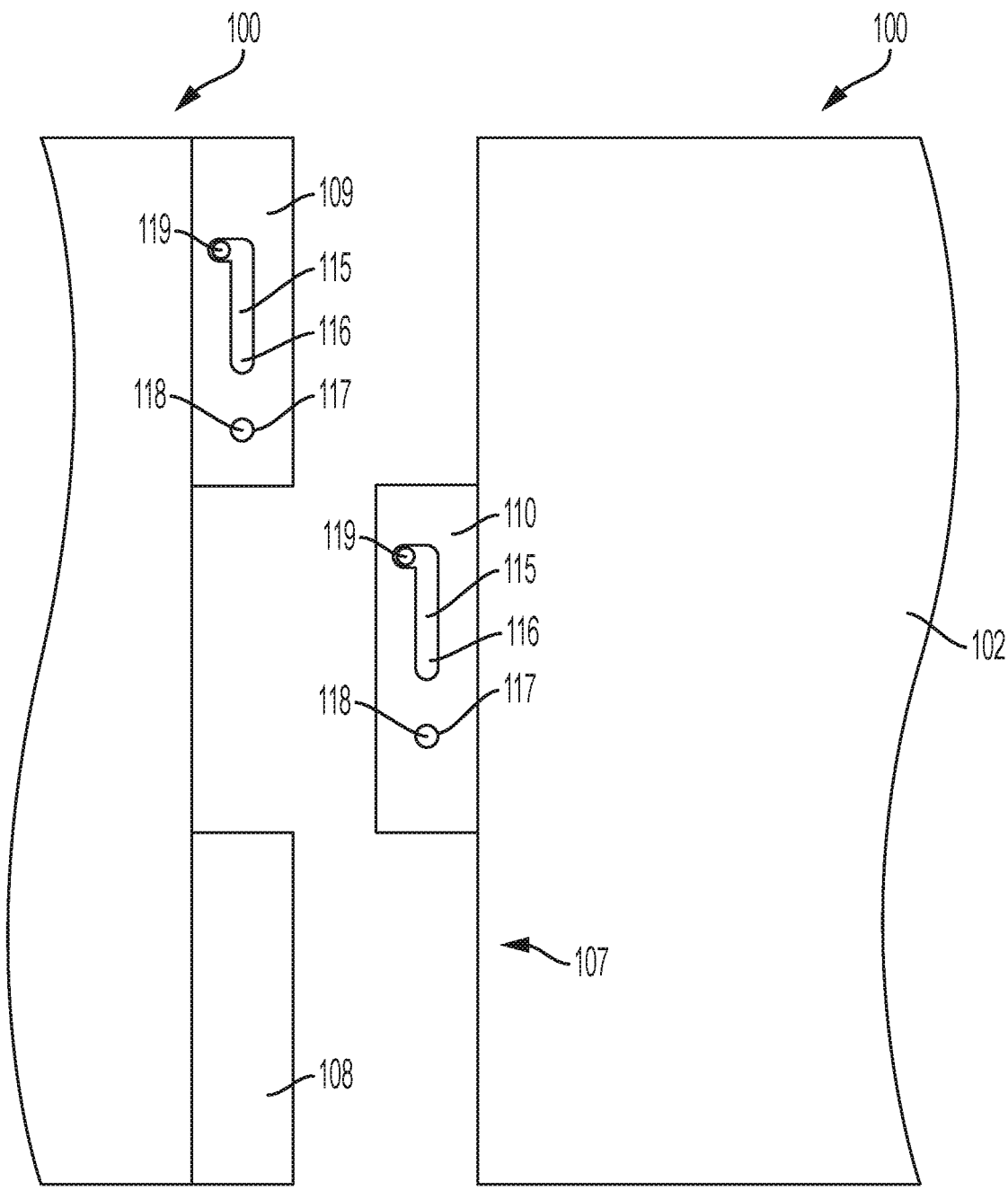
FIG. 4A is a detail schematic view of two hinged ballistic resistant panels shown in FIG. 1, showing exterior hinge components in the disassembled configuration.

The present invention relates to products designed to protect people in active shooter situations from injury. In one embodiment, the invention comprises a series of hinged ballistic resistant panels that are capable of being nested together when stored, but typically will be set up in a configuration in the room, in the corner of the room, or in any defined area.

Turning now to FIGS. 1-3, one embodiment of a hinged ballistic resistant panel 100 in accordance with the invention is shown. Hinged ballistic resistant panel 100 is designed to meet NIJ Level III, but may be designed to meet more or less protection standards depending on the material used to construct the panel. Ballistic resistant panel 100 includes a ballistic resistant section 102, a frame 104, a skirt 106, a plurality of leaves 108, 109, and 110, a plurality of legs 112, and a plurality of casters 114, wherein one caster is attached to an end of each of the plurality of legs. In alternative embodiments, the ballistic resistant panel may Depending on the height of the ballistic resistant panel 100, more or fewer leaves may be provided. For instance, if the panel is four feet high, three leaves may be sufficient, whereas if the panel is five or six feet high or more, additional leaves may be included. Of course, any hinge configurations having additional or fewer leaves may alternatively be used without departing from the invention. In some embodiments, the section 102 is connected to the leaves 108, 109, 110, and legs 112 by means of the frame 104. In some embodiments, the ballistic resistant panel 100 may not require the use of a frame 104 to support the section 102, leaves 108, 109, 110, or legs 112. In such embodiments, the leaves 108, 109, 110 and legs 112 may be integrally formed with or attached directly to section 102.

In the embodiment shown, section 102 is made of ballistic resistant materials and/or bullet resistant steel. Some non-limiting examples of ballistic resistant materials are Kevlar, bullet resistant glass, titanium, certain carbon fiber composites, or ultra-high-molecular-weight polyethylene. Of course, some components may be made of any other suitable material without departing from the invention. All other components, except the casters 114, may be made of ballistic resistant materials and/or bullet resistant steel. In alternative embodiments, panel 100 may be fixed in position, i.e., panel 100 would not include any casters 114 and the panel would be very difficult to move around a room.

In the embodiment shown, a layer of magnetic whiteboard material 120 is laminated onto section 102, but any suitable material, including but not limited to corkboard or chalkboard, may be laminated onto ballistic resistant panel 100, to make the product a functional multipurpose teaching tool, without departing from the invention. In some embodiments, ballistic resistant panel 100 may be used without any decorative layer laminated onto it.

Continuing with FIG. 1, a lower leaf 108 and an upper leaf 109, are connected to a first side of section 102, with a middle leaf 110 attached to the opposite, second, side of the section. This configuration allows additional ballistic resistant panels to be removably and rotatably attached to each other. In the embodiment shown, the leaves 108, 109, 110 are integrally formed into frame 104, but may be attached to frame 104 or connected to section 102 by any suitable means without departing from the invention.

Legs 112 are connected to the bottom of section 102. In the embodiment shown, each leg 112 has a first end 116 and a second end 113. First end 116 is attached to frame 104, with leg 112 extending outward from frame 104 any suitable distance to provide a stable base to ballistic resistant panel 100. In the embodiment shown, leg 112 extends at a 45 degree angle from frame 104, which allows ballistic resistant panels to be positioned perpendicular to each other, as well as at angles greater than 90 degrees. In at least some embodiments, the angle of each leg 112 with respect to the frame 104 may be changed or swung, up to 90 degrees or more. In the embodiment shown, skirt 106 extends from the bottom of frame 104 to substantially cover any gap between the section 102 and the floor. It is desirable to cover the aforementioned gap to avoid a vulnerability along the bottom of the ballistic resistant panel 100. Skirt 106 may be made of any suitable ballistic resistant material, and may, in some embodiments, be adjustable to allow a user to dial-in the amount of clearance needed between the floor and the skirt. For example, in some environments, the floor may be carpeted, which may call for a wider gap than an environment with a hard floor. Another example where a slightly larger gap may be desirable is an environment with obstacles such as wires or cable channels that a user may have to navigate over when using the ballistic resistant panel 100.

A caster 114 is rotatably attached to the second end 113 of each leg 112. Due to the weight of ballistic resistant panel 100, it may be necessary for casters 114 to be heavy duty, but any suitable caster may be used without departing from the invention. Alternative embodiments may also use other means for moving the ballistic resistant panel 100 without departing from the invention. In the embodiment shown, all casters 114 may rotate 360 degrees, but it may alternatively be desirable to restrict the rotation on some of the casters 114. It may also be desirable to allow a user to selectively lock casters 114 to restrict unwanted movement of the ballistic resistant panel 100.

Figure 5:
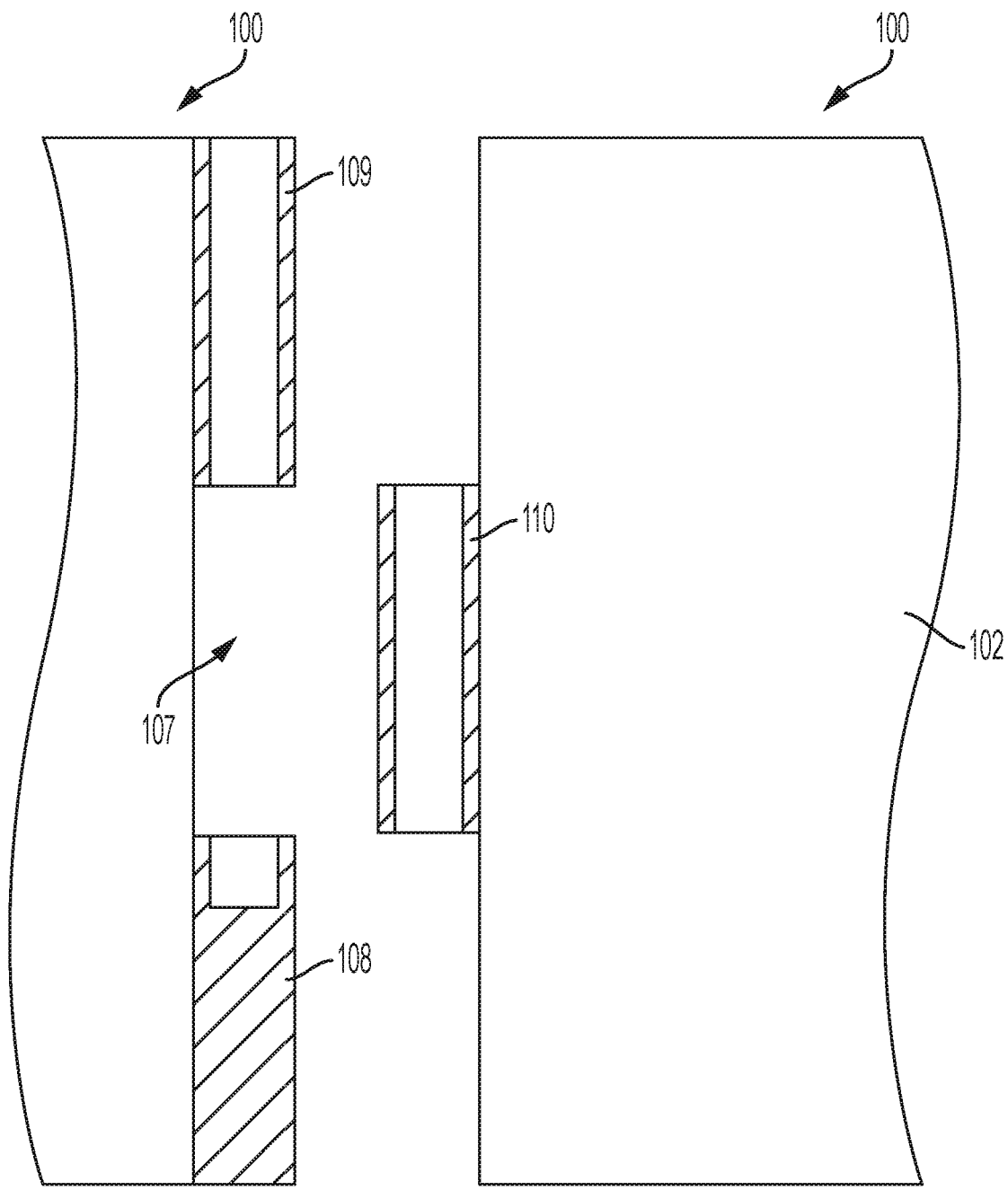
FIG. 5 is a sectional view of the two hinged ballistic resistant panels shown in FIG. 4 taken generally along the line 5-5 in FIG. 4, showing the configuration of the hinge leaves.

Turning now to FIGS. 4-9, one embodiment of a leaf hinge 107 in accordance with the invention is shown. In the embodiment shown, leaf hinge 107 is formed of a plurality of leaves, including lower leaf 108, upper leaf 109, and middle leaf 110. Each of the leaves includes an outer frame forming a tube, which is at least mostly filled with a pin 116 formed of solid, may be made of ballistic resistant material, such as steel. As shown in FIG. 5, upper leaf 109 and middle leaf 110 are hollow. Lower leaf 108 is partially hollow, but mostly solid. In alternative embodiments, lower leaf 108 may also be hollow, may be filled with a steel pin, and may be made of a ballistic material. As shown, the leaves 108, 109, and 110 are made of steel, but any other suitable material could be used without departing from the invention.

As shown in FIG. 4, upper leaf 109 and middle leaf 110 include L shaped slots 115. Each L shaped slot 115 provides access a hinge pin 116 that is inserted into each leaf 109, 110. As shown, each hinge pin 116 includes a hole (not shown) into which a protrusion 119 may be removably attached. In the embodiment shown, the hole is threaded and protrusion 119 includes corresponding threads, but alternative configurations may be used without departing from the invention. Protrusion 119 provides a handle of sorts, to allow a user to manipulate pin 116 to selectively engage the adjacent leaf. In the embodiment shown, the diameter of protrusion 119 is such that it fits inside the L shaped slot 115. In alternative embodiments, however, the diameter of at least a portion of protrusion 119 may be large enough to provide a surface that selectively engages an outside surface of the leaf 109, 110, thereby allowing a user to secure the pin in a desired location. In some embodiments, the hole and protrusion 119 may be threaded to allow a user to selectively tighten and loosen the protrusion in relation to the pin 116. In other embodiments, protrusion 119 may be permanently attached to the pin 116 by welding, glue, or any other suitable means.

In the embodiment shown, upper leaf 109 and middle leaf 110 each further include an optional drilled and tapped hole 117 into which a setscrew 118 may be inserted to secure the pin 116 in either a locked or unlocked position. In alternative embodiments, L shaped slot 115 may have any desired shape without departing from the invention. Additionally, alternative embodiments may omit the drilled and tapped hole 117 and set screw 118.

Figure 6:
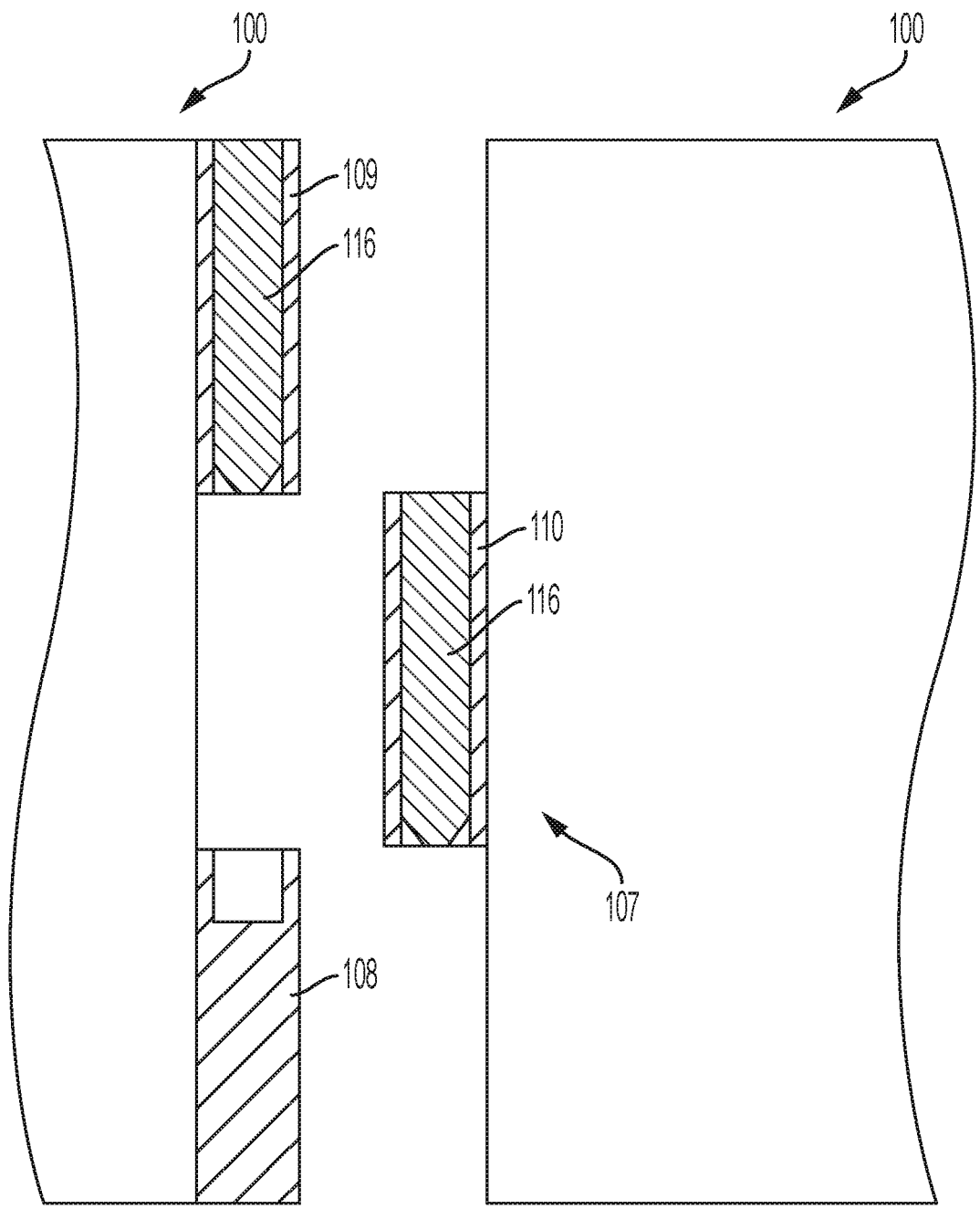
FIG. 6 is another sectional view of the two hinged ballistic resistant panels as shown in FIG. 5, showing the positioning of hinge pins in the disassembled configuration.

As shown in FIG. 6, hinge pins 116 are disposed within upper leaf 109 and middle leaf 110. When leaf hinge 107 is disassembled, setscrews 118 are tightened to retain the hinge pins 116 inside their respective leaves. Like the leaves 108, 109, and 110, hinge pins 116 are made of ballistic resistant steel in some embodiments, but any other suitable material may be used without departing from the invention. The hinge pins 116 can move between a retracted position and an extended position. When a hinge pin 116 is in the retracted position, the pin does not extend outside of its leaf 109, 110. When the hinge pin 116 is in the extended position, the pin extends below its leaf 109, 110.

Figure 7:
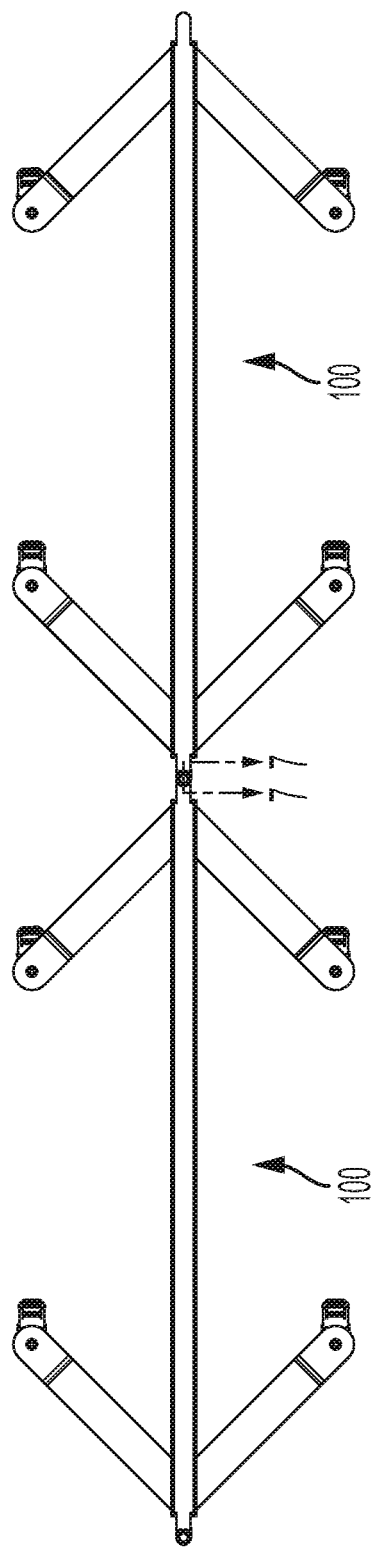
FIG. 7 is a top view of two hinged ballistic resistant panels shown in FIG. 1, showing the ballistic resistant panels in an assembled configuration.
Figure 7A:
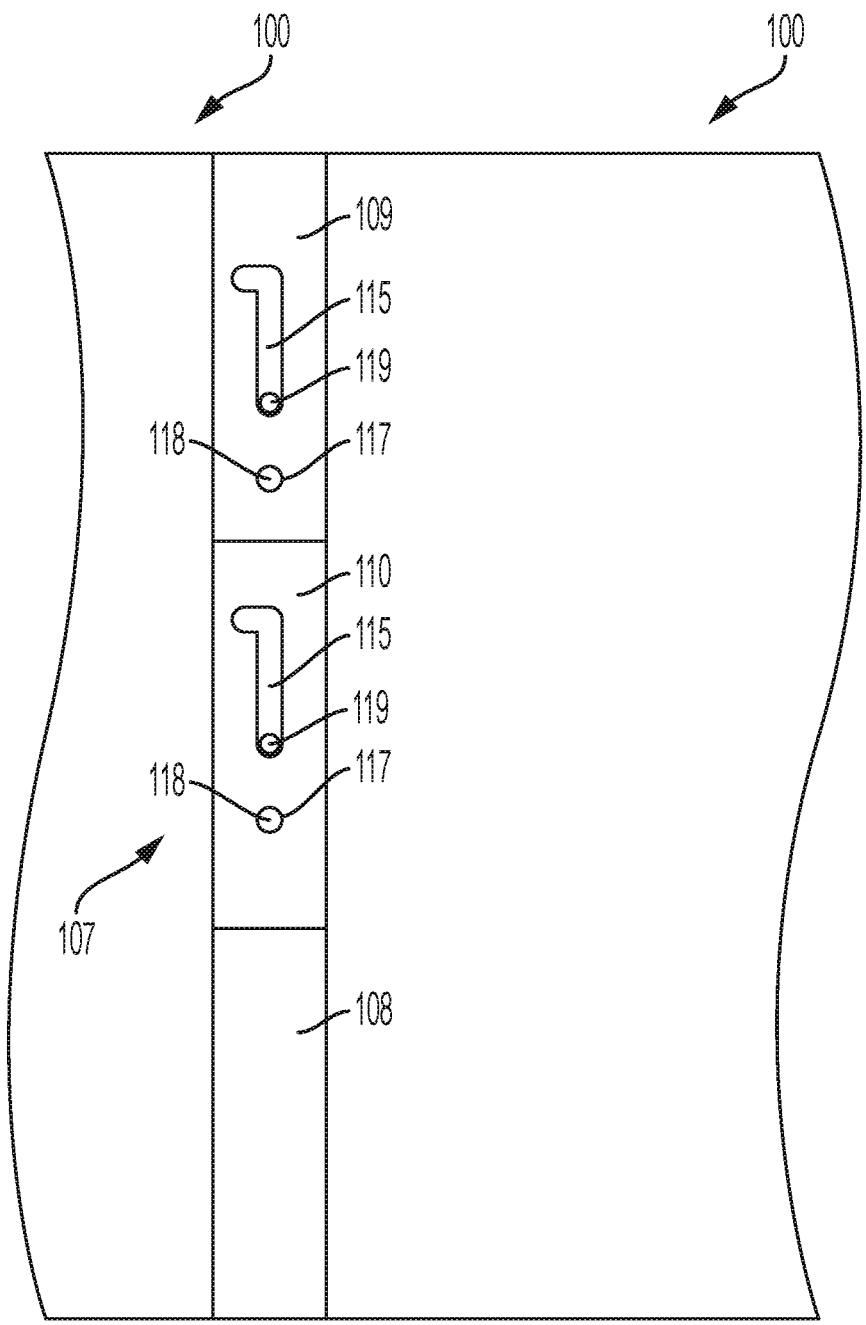
FIG. 7A is a detail schematic view of two hinged ballistic resistant panels shown in FIG. 1, showing exterior hinge components in an assembled configuration.
Figure 8:
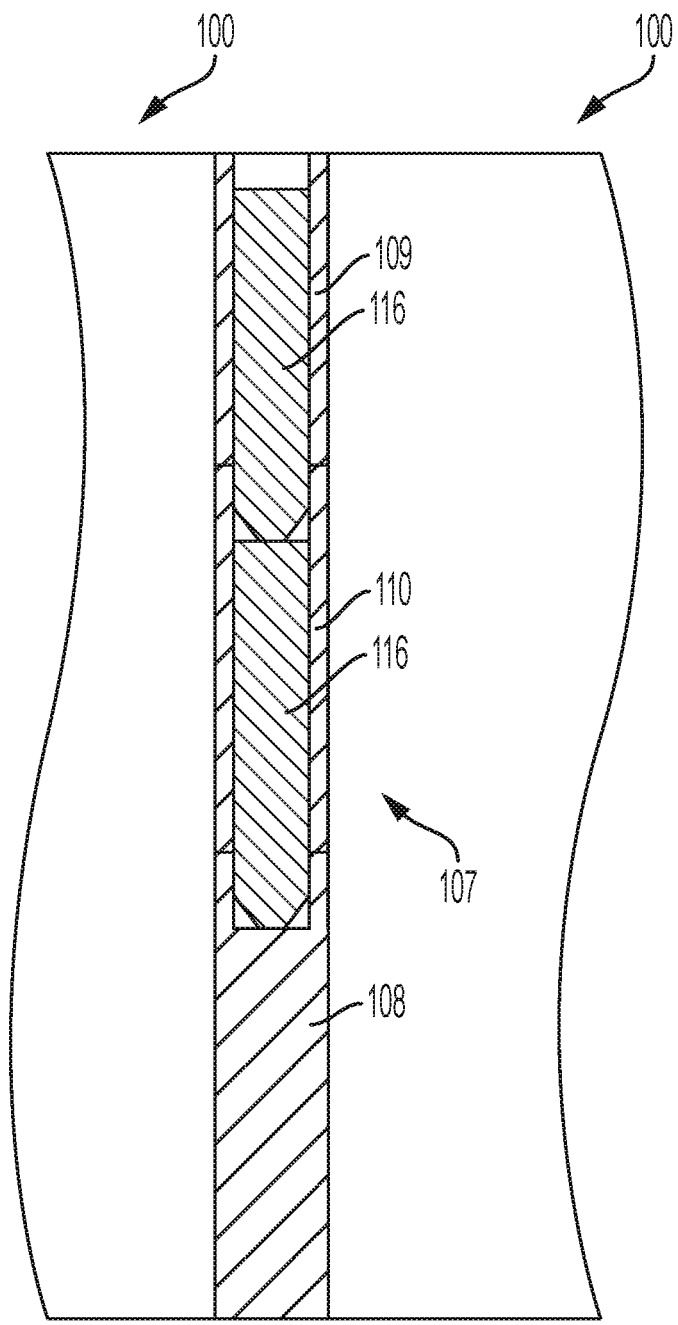
FIG. 8 is a sectional view of the two hinged ballistic resistant panels shown in FIG. 7 taken generally along the line 8-8 in FIG. 7, showing the positioning of the hinge pins in the assembled configuration.

FIG. 7 shows leaf hinge 107 in an assembled configuration. As shown, upper leaf 109 and lower leaf 108 are aligned with each other when the ballistic resistant panel 100 is first constructed. When leaf hinge 107 is assembled, upper leaf 109 and lower leaf 108 of a first panel 100 are aligned with the middle leaf 110 of a second, adjacent, panel. To assemble leaf hinge 107, the protrusions 119 are loosened, which releases hinge pins 116. Once released, a user can rotate the hinge pins 116 by manipulating the protrusions 119, such that each hinge pin 116 can moved to an extended position into the leaf immediately below the leaf in which the pin was previously secured in the retracted position. In the embodiment shown, the partially hollow portion of lower leaf 108 provides space into which the hinge pin 116 from the middle leaf 110 may enter, thereby securing the leaves together. FIG. 8 is a section view showing the position of hinge pins 116 when leaf hinge 107 is fully assembled. Because lower leaf 108 is mostly solid, only a minimal portion of upper leaf 109 is left hollow when the leaf hinge 107 is fully assembled. Minimizing the portion of upper leaf 109 that is left hollow, and locating the only hollow part of leaf hinge 107 at the top of the hinge results in a very robust hinge that is capable of continuing the protection offered by the rest of ballistic resistant panel 100.

Figure 9:
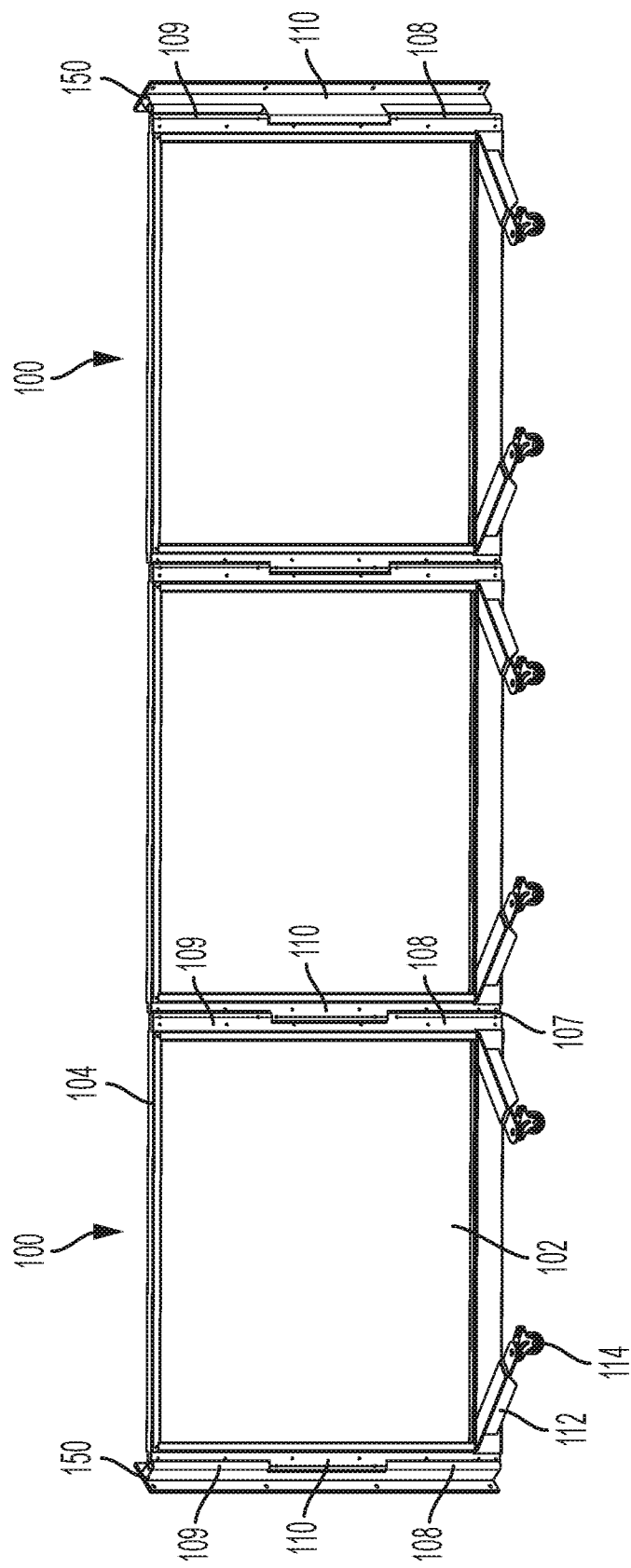
FIG. 9 is a schematic view of a barrier comprised of three hinged ballistic resistant panels with wall mounts in accordance with the invention.
Figure 10:
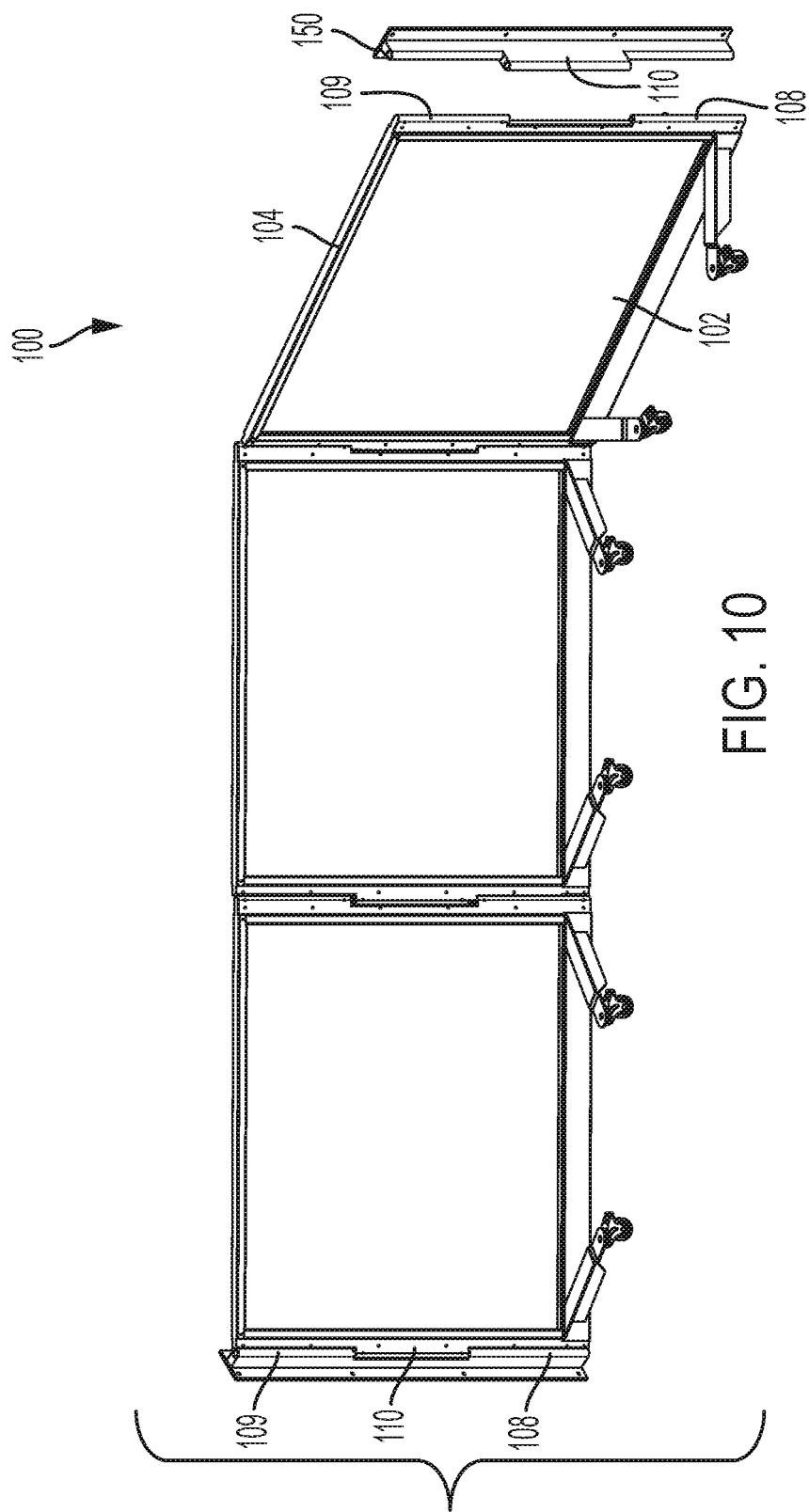
FIG. 10 is another schematic view of the barrier shown in FIG. 9, showing an alternative configuration of the hinged ballistic resistant panels wherein one of the hinged ballistic resistant panels is separated from a wall mount.

FIGS. 9-13 show a variety of configurations of assembled barriers incorporating hinged ballistic resistant panel 100. FIG. 9 shows three ballistic resistant panels 100, arranged in a row, and attached at either end to wall mounts 150. As shown, wall mounts 150 may either include an upper leaf 109 and a lower leaf 108, or a middle leaf 110. FIG. 10 shows the same three ballistic resistant panels 100 shown in FIG. 9, but one of the panels has been disconnected from a wall mount 150.

Figure 11:
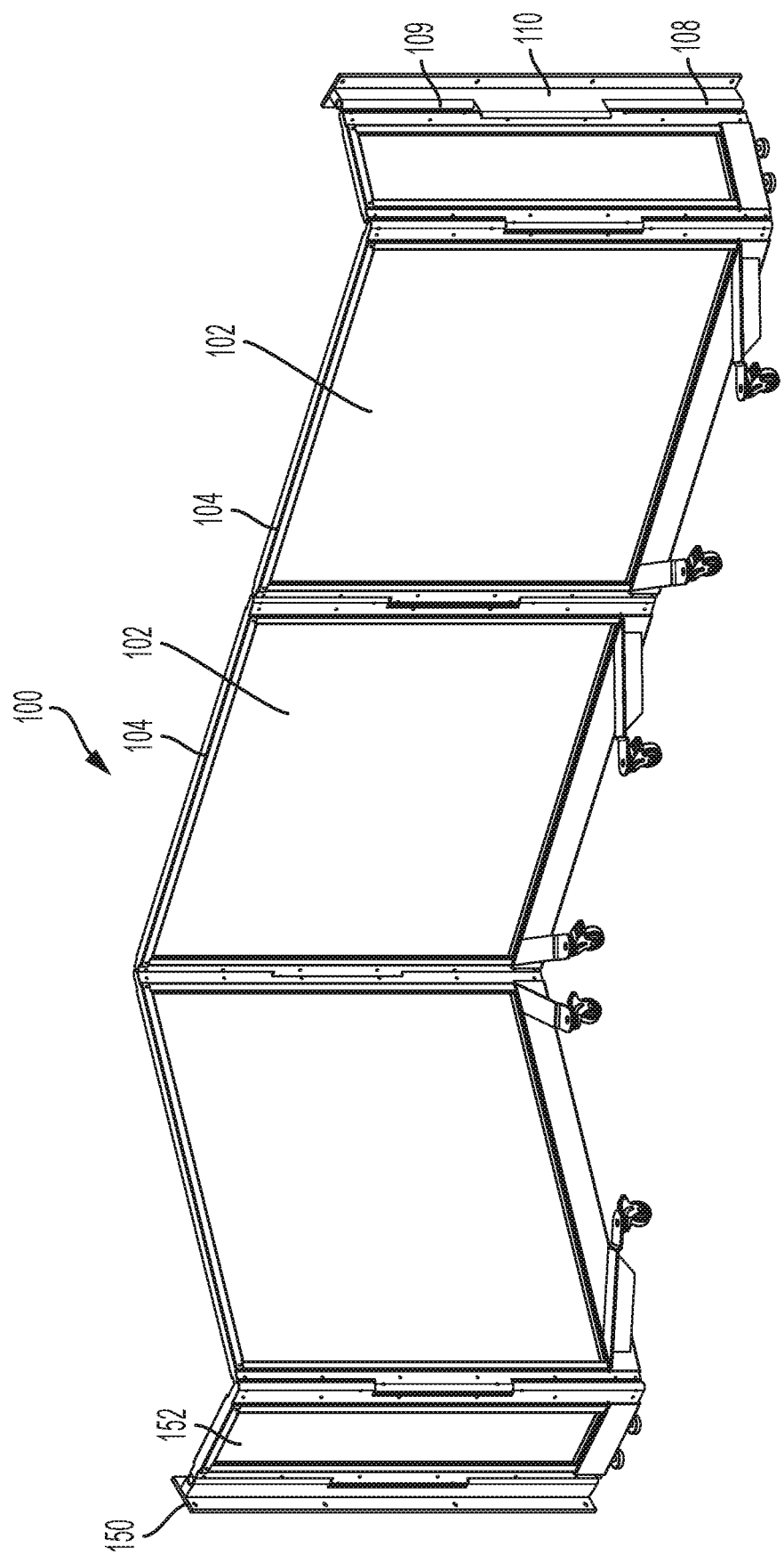
FIG. 11 is a schematic view of a barrier comprised of three hinged ballistic resistant panels, two extender panels, and wall mounts.
Figure 12:
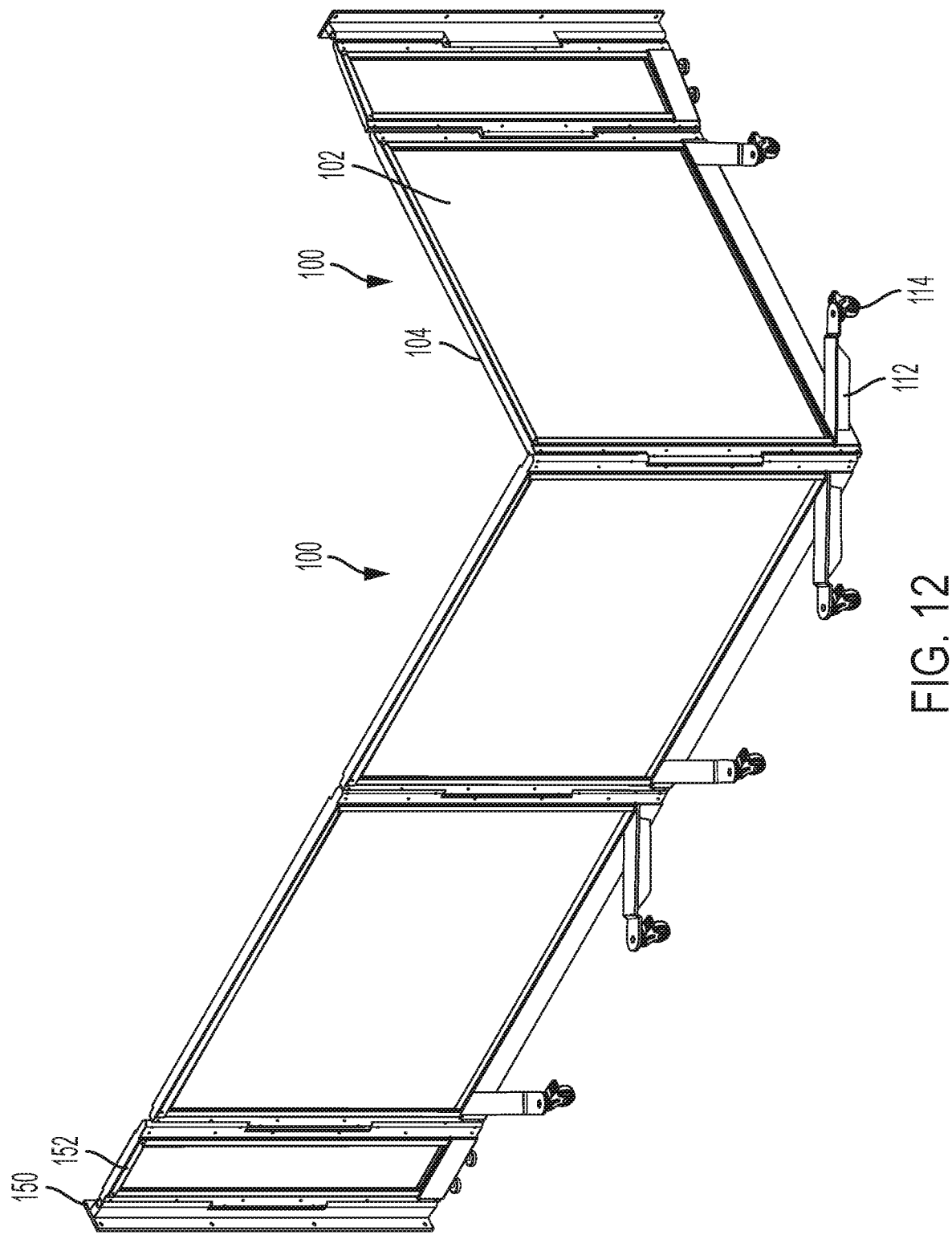
FIG. 12 is a schematic view of the barrier shown in FIG. 11 showing the hinged ballistic resistant panels in an alternative configuration.
Figure 13:
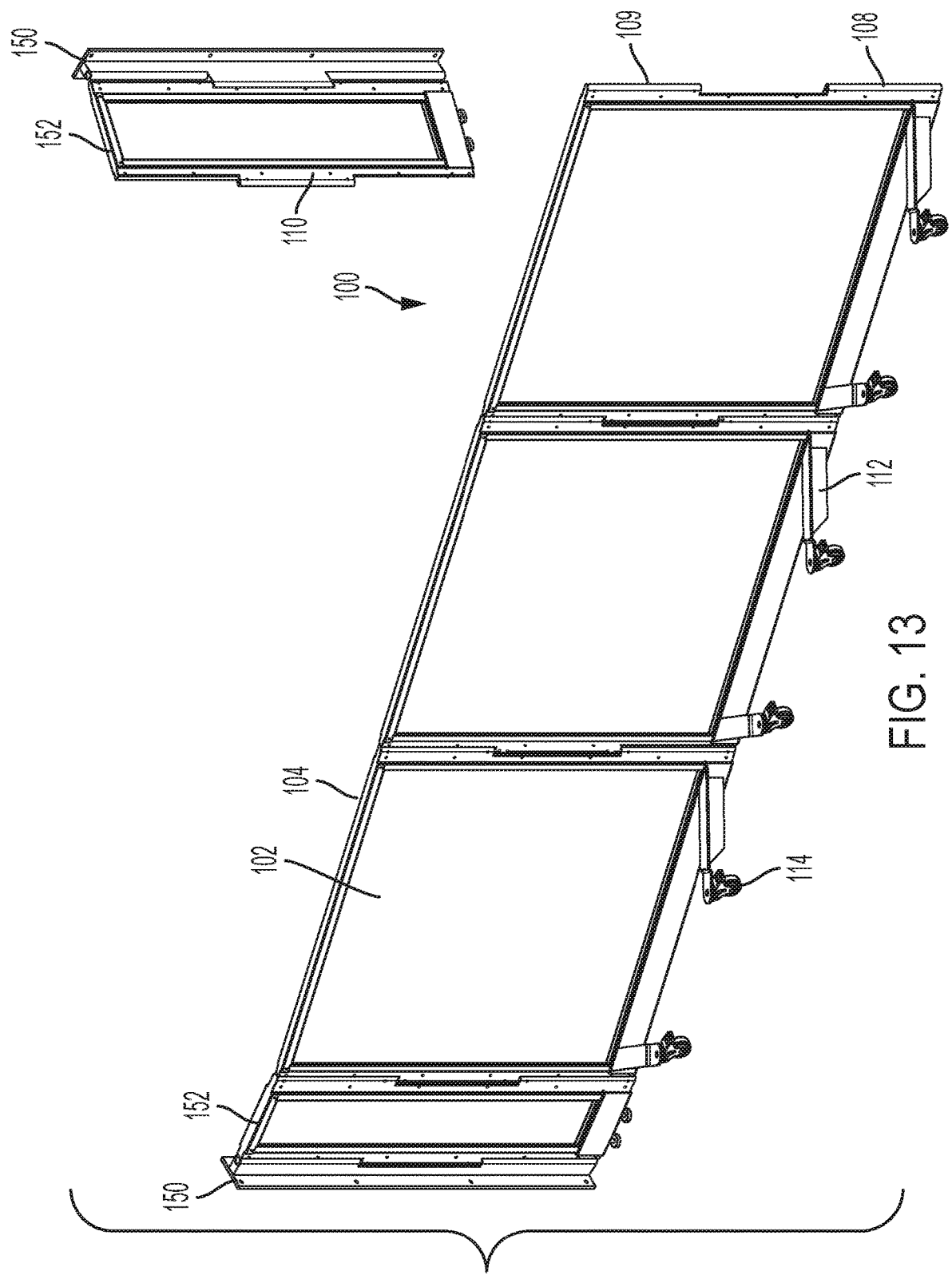
FIG. 13 is a schematic view of the barrier shown in FIG. 11 showing the hinged ballistic resistant panels in yet another alternative configuration, wherein one of the hinged ballistic resistant panels is separated from an extender panel.

FIGS. 11-13 show alternative configurations of ballistic resistant panels 100, and further including extender panels 152. Extender panels 152 are constructed identically to the ballistic resistant panels 100, except the extender panels are sized such that ballistic resistant panels can be stored against a wall without disconnecting the panel from a wall mount 150. Both ballistic resistant panels 100 and extender panels 152 can be made in any size or shape without departing from the invention.

In some embodiments, means for attaching accessories may be included on the panel 100 itself, or on the frame 104, or on the leaves. Each of these accessories may include one or more legs which would still be oriented at an angle, such as 45 degrees, so as to avoid interfering with the function of the hinges, and thus enabling the panels to be pivoted up to 90 degrees or more. In one example, a series of slots (¼" by ⅝", 1" on center) is placed in vertical frame steel posts enabling the panel systems to have a bench, and/or work surfaces, and/or shelves, and/or bolsters, etc.

Figure 14:
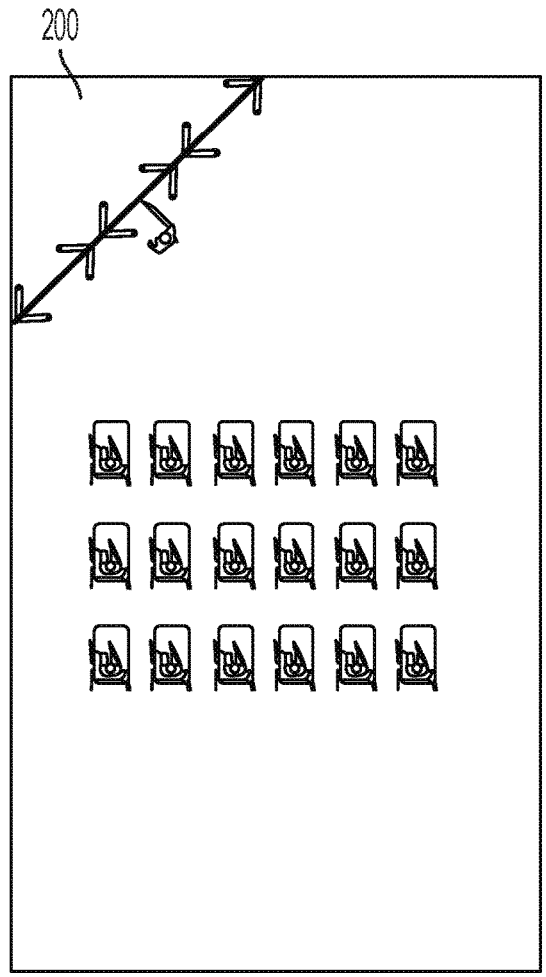
FIG. 14 is an overhead schematic view of a classroom showing one configuration of a barrier using the hinged ballistic resistant panel in FIG. 1.
Figure 15:
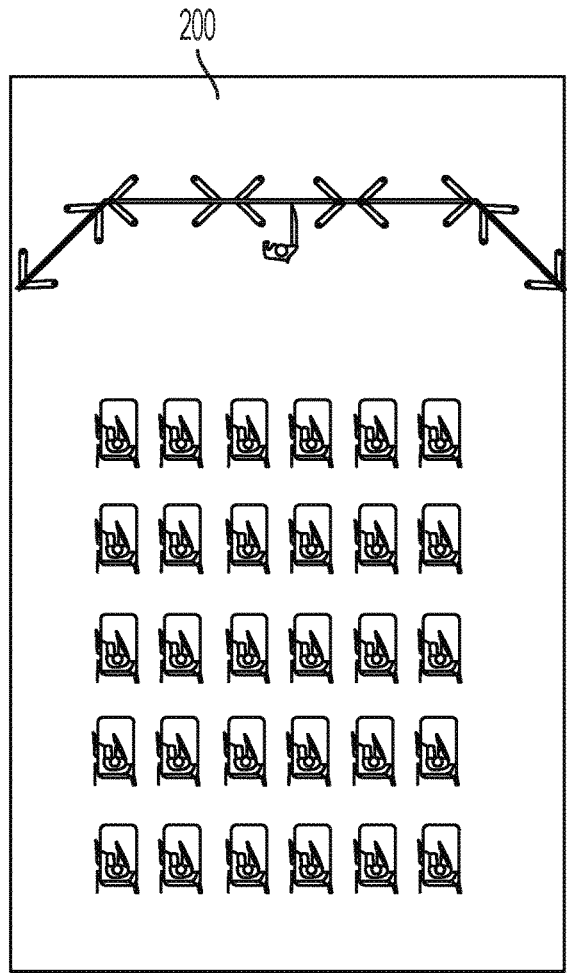
FIG. 15 is another overhead schematic view of a classroom showing one configuration of a barrier using five of the hinged ballistic resistant panel of FIG. 1.

Turning now to FIGS. 14-15, two non-limiting examples of how the ballistic resistant panels 100 may be arranged in a classroom are shown. FIG. 14 is an overhead schematic view of a classroom, showing three ballistic resistant panels 100 arranged in a corner of the classroom. FIG. 15 shows another overhead schematic view of a classroom showing five ballistic resistant panels arranged across the entire width of the classroom. It is evident from the overhead views of FIGS. 14 and 15 that choices about how many panels 100 are included in a classroom and how they are oriented affect the amount of protected space 200 available behind the panels. For example, the classroom of FIG. 14 has fewer students than the classroom of FIG. 15, so the amount of protected space 200 needed behind the ballistic resistant panels is less than what is needed in the classroom of FIG. 15. The ease with which the ballistic resistant panels 100 can be securely attached to each other provides the flexibility necessary to provide adequate protection to classes of many sizes and configurations.

Figure 16:
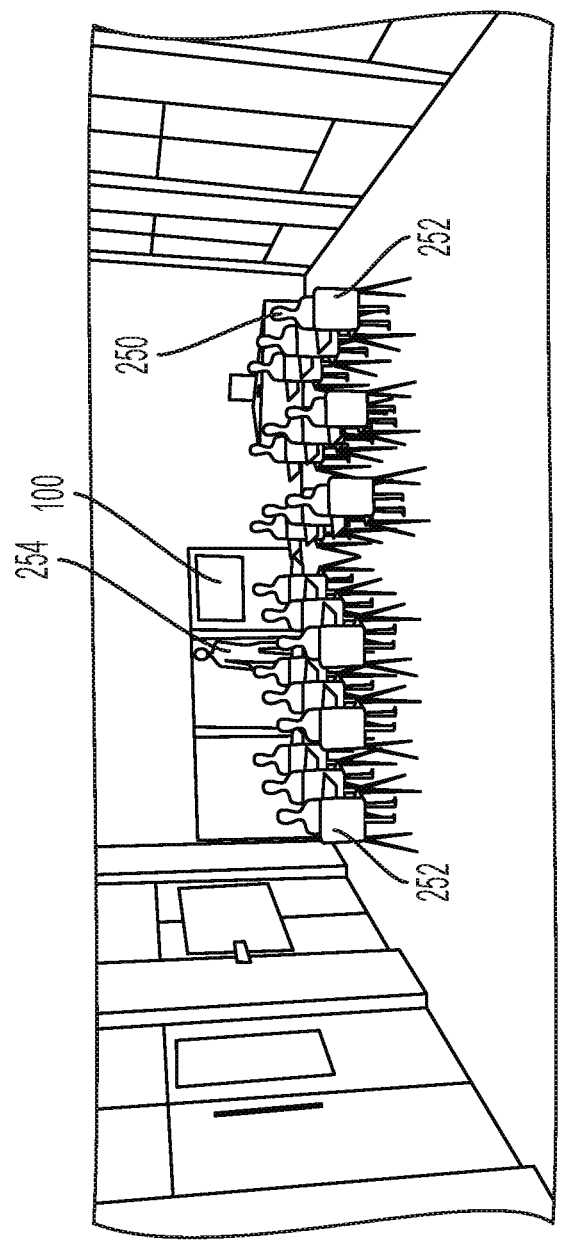
FIG. 16 is a perspective schematic view of a classroom showing one configuration of a barrier using three of the hinged ballistic resistant panel of FIG. 1.
Figure 17:
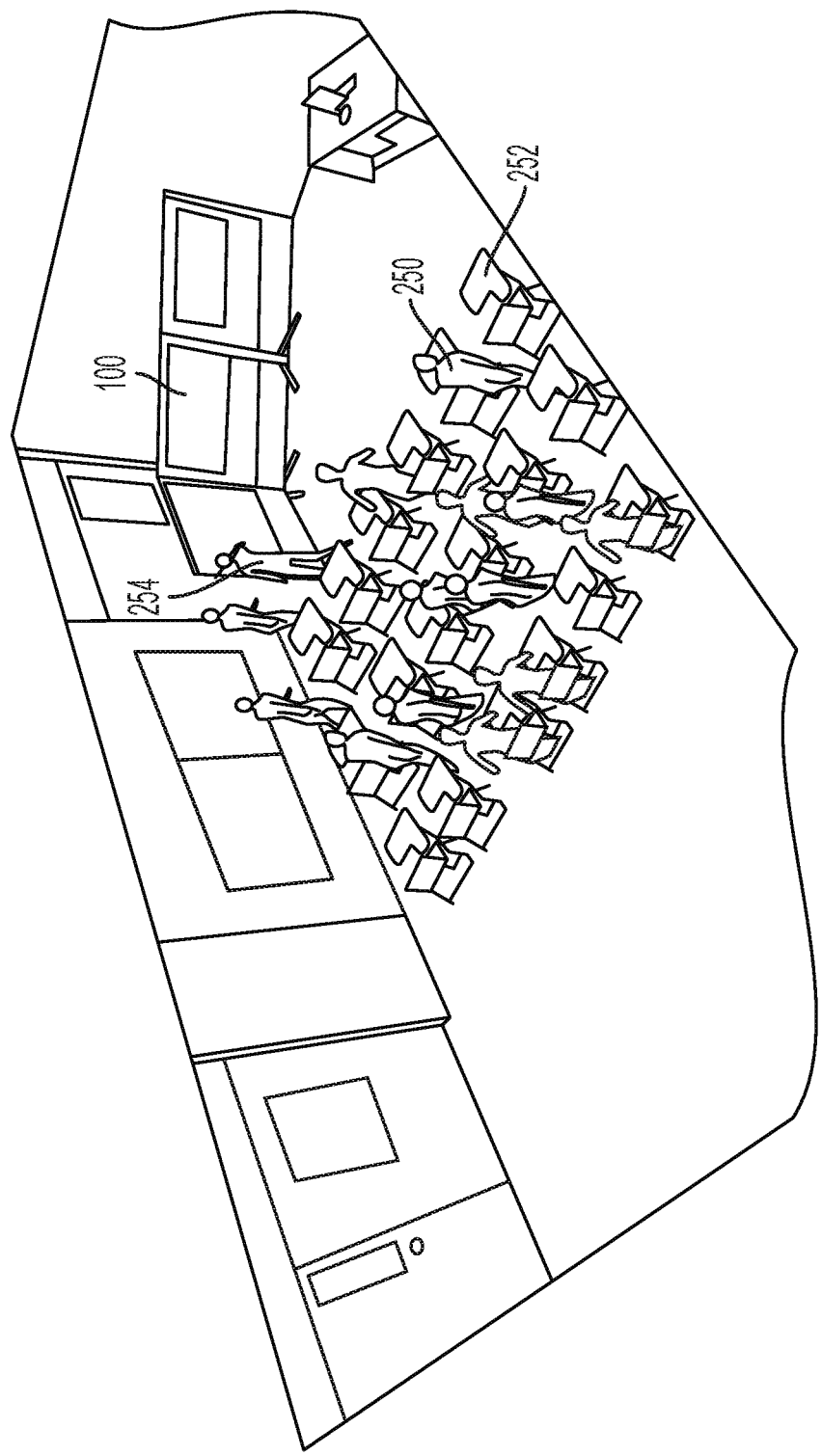
FIG. 17 is a perspective schematic view of a classroom showing one configuration of a barrier using the hinged ballistic resistant panel of FIG. 1 further showing how one panel may be moved to provide a path that allows people to seek shelter behind the barrier.
Figure 18:
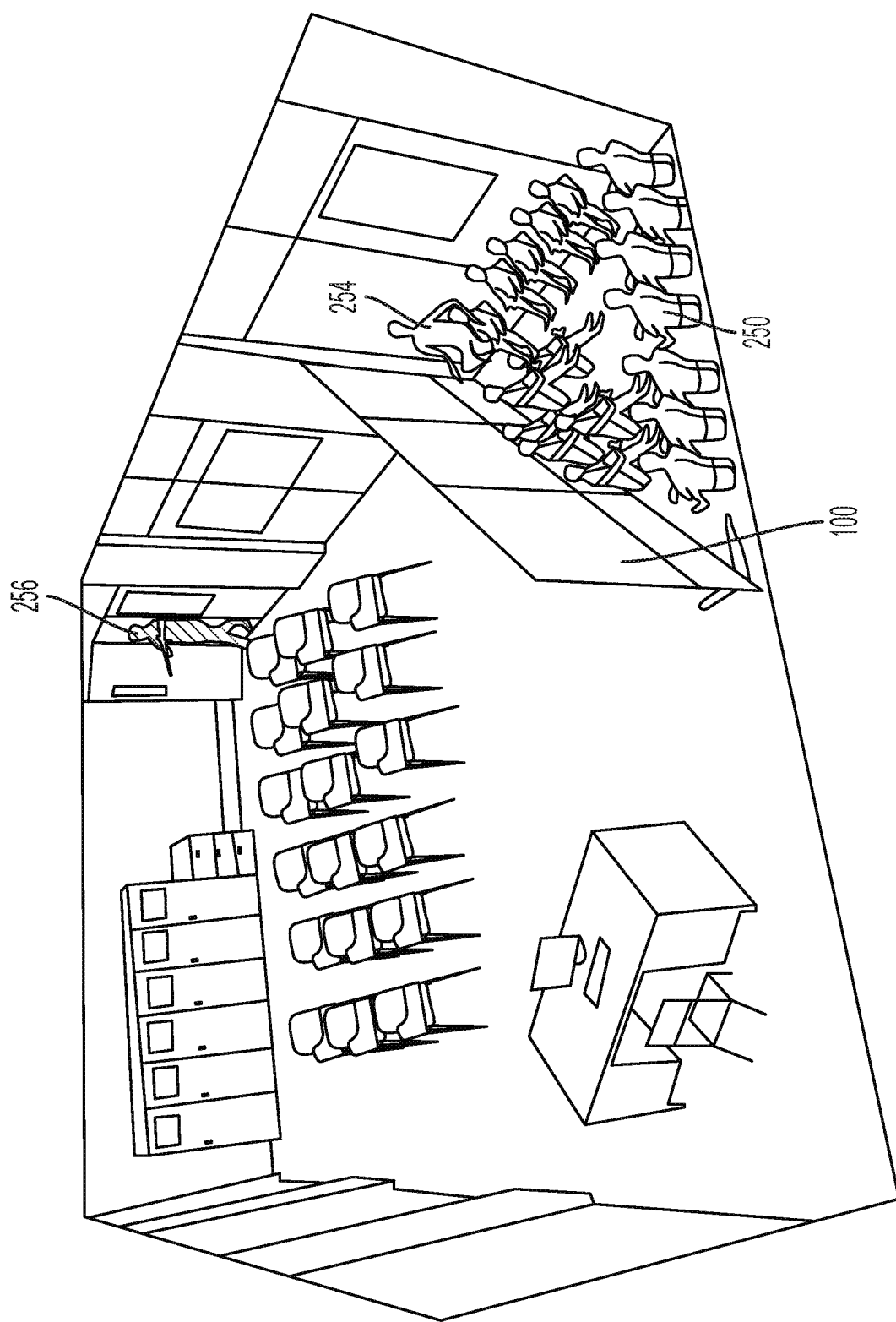
FIG. 18 is a perspective schematic view of a classroom showing one configuration of a barrier using the hinged ballistic resistant panel of FIG. 1 further showing how people may seek shelter behind the barrier.

FIGS. 16-18 show, in a series of schematics, how a classroom full of students can quickly seek shelter behind an arrangement of ballistic resistant panels 100. FIG. 16 shows a classroom prior to an active shooter situation. Students 250 are seated at their desks 252, and a teacher 254 is using at least one of the ballistic resistant panels 100 as a whiteboard or chalkboard. FIG. 17 shows the classroom just after an active shooter alarm has been sounded. As shown, the teacher 254 has moved one of the ballistic resistant panels 100 away from the wall, and students 250 are making their way to a secure area behind the panels. Turning now to FIG. 18, a view from behind the ballistic resistant panels 100 is shown. In FIG. 18, the students 250 and their teacher 254 are safely sheltered behind the ballistic resistant panels 100. Meanwhile, an active shooter 256 has entered the classroom, but is unable to breach the barrier made of ballistic resistant panels 100.

Figure 19:
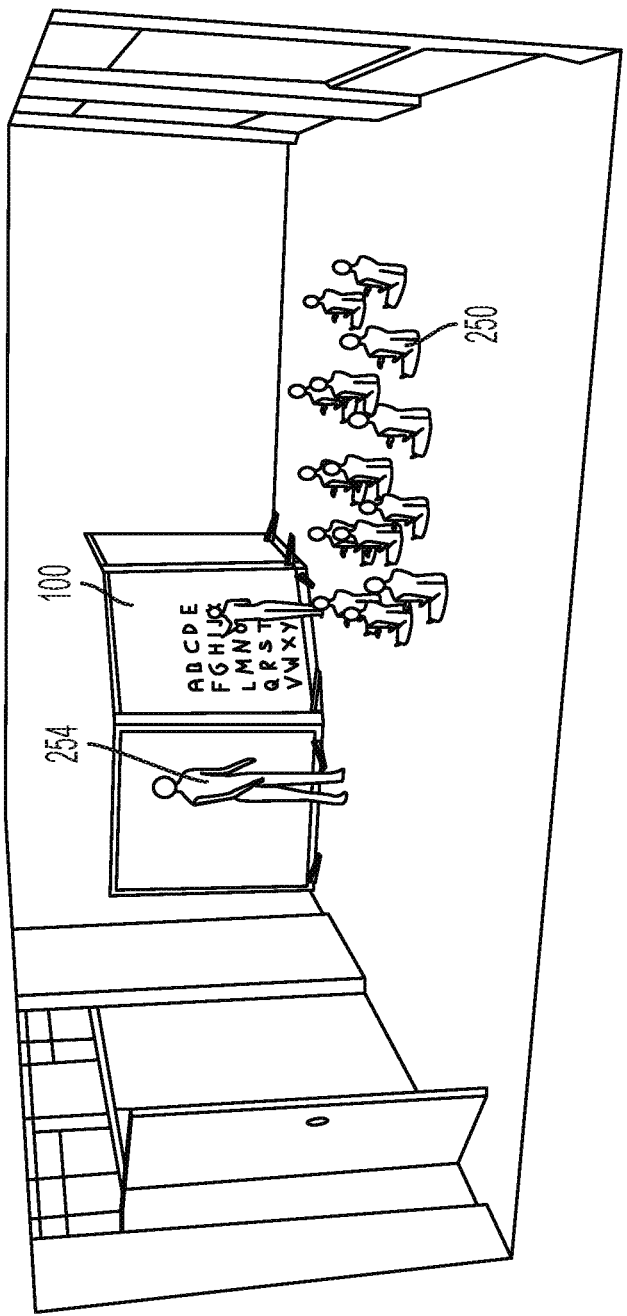
FIG. 19 is a perspective schematic view of a classroom showing one configuration of a barrier using the hinged ballistic resistant panel of FIG. 1, with the surface of the panel being used as a teaching tool.
Figure 20:
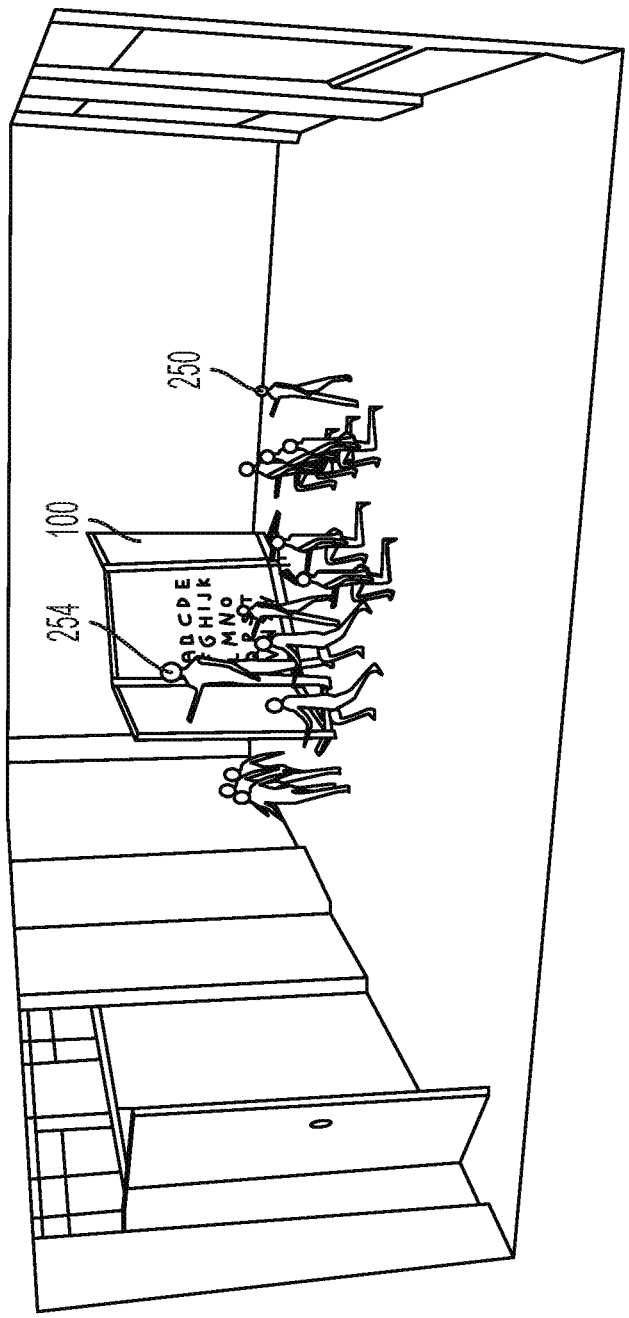
FIG. 20 is a perspective schematic view of a classroom showing one configuration of a barrier using the hinged ballistic resistant panel of FIG. 1 further showing how one panel may be moved to provide a path that allows people to seek shelter behind the barrier.
Figure 21:
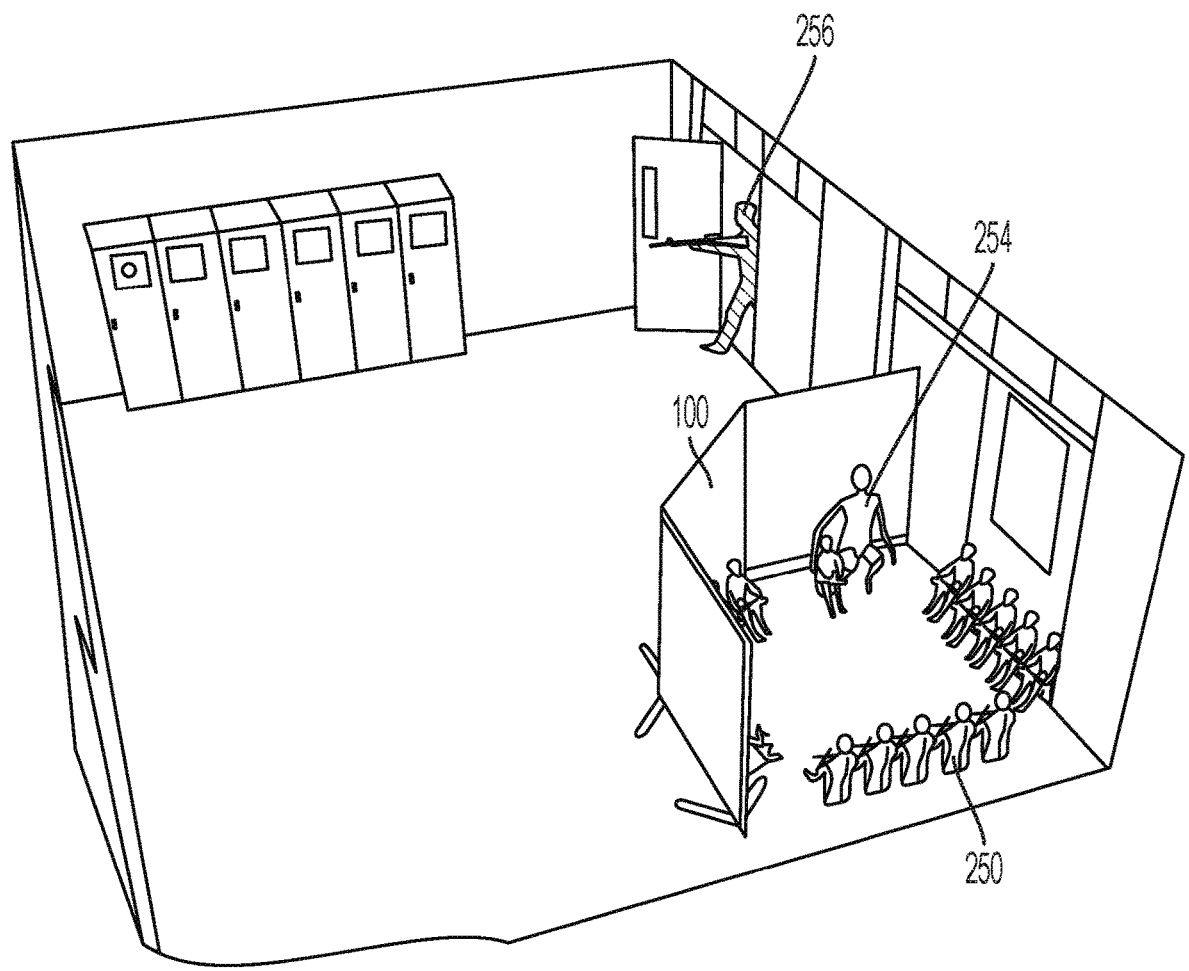
FIG. 21 is a perspective schematic view of a classroom showing one configuration of a barrier using the hinged ballistic resistant panel of FIG. 1 further showing how people may seek shelter behind the barrier.

FIGS. 19-21 show another sequence of schematics demonstrating how a class of students 250 can seek shelter behind ballistic resistant panels 100. In FIG. 19, students 250 are seated on the floor in front of three ballistic resistant panels 100 while teacher 254 gives a lesson. In FIG. 20, an active shooter alarm has been sounded so the teacher 254 has moved one of the ballistic resistant panels 100 away from the wall to provide a path for students to gather behind the panels. FIG. 21 shows an active shooter 256 entering the classroom, but he is unable to breach the barrier made of ballistic resistant panels 100.

Figure 22:
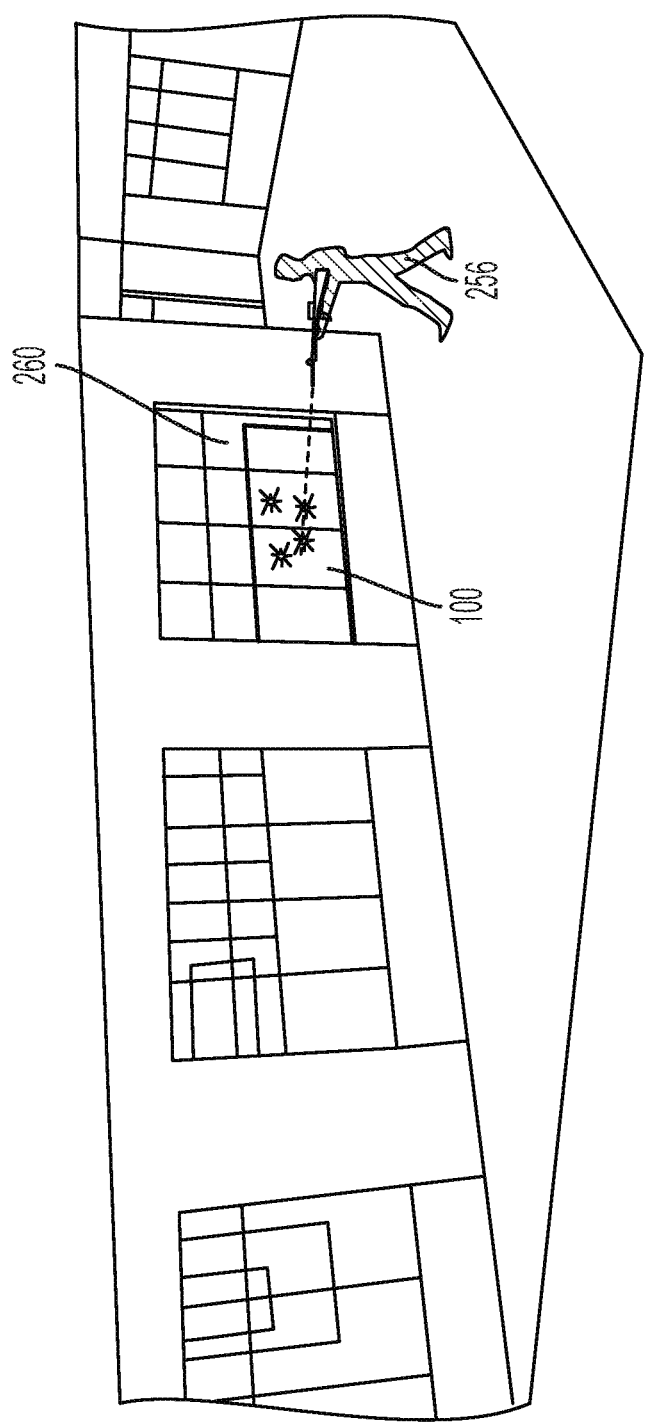
FIG. 22 is a perspective schematic view of a building showing a barrier using the hinged ballistic resistant panel of FIG. 1 positioned behind a window to protect people inside the room from an attacker positioned outside the building and shooting through the window.
Figure 23:
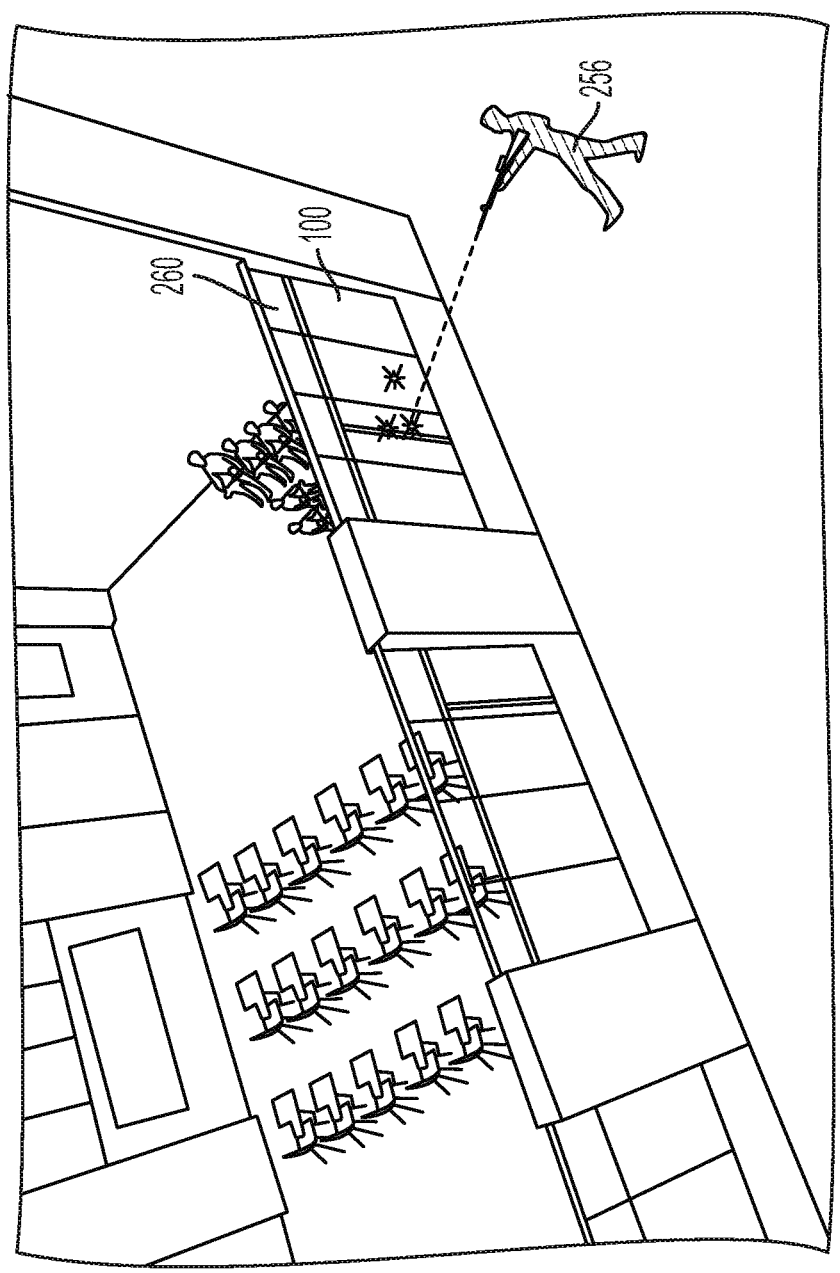
FIG. 23 is another perspective schematic view of a building showing a barrier using the hinged ballistic resistant panel of FIG. 1 positioned behind a window to protect people inside the room from an attacker positioned outside the building and shooting through the window.

FIGS. 22 and 23 show a situation where an active shooter 256 is approaching a classroom from the outside of the school. As shown, the shooter 256 is firing through exterior windows 260. However, the teacher 254 and students 250 have sheltered behind a barrier made of ballistic resistant panels 100 that have been moved in front of the exterior windows 260. FIGS. 22 and 23 further demonstrate the flexibility of the ballistic resistant panels 100 to provide shelter and protection from a variety of threats.

Figures 24A, 24B:
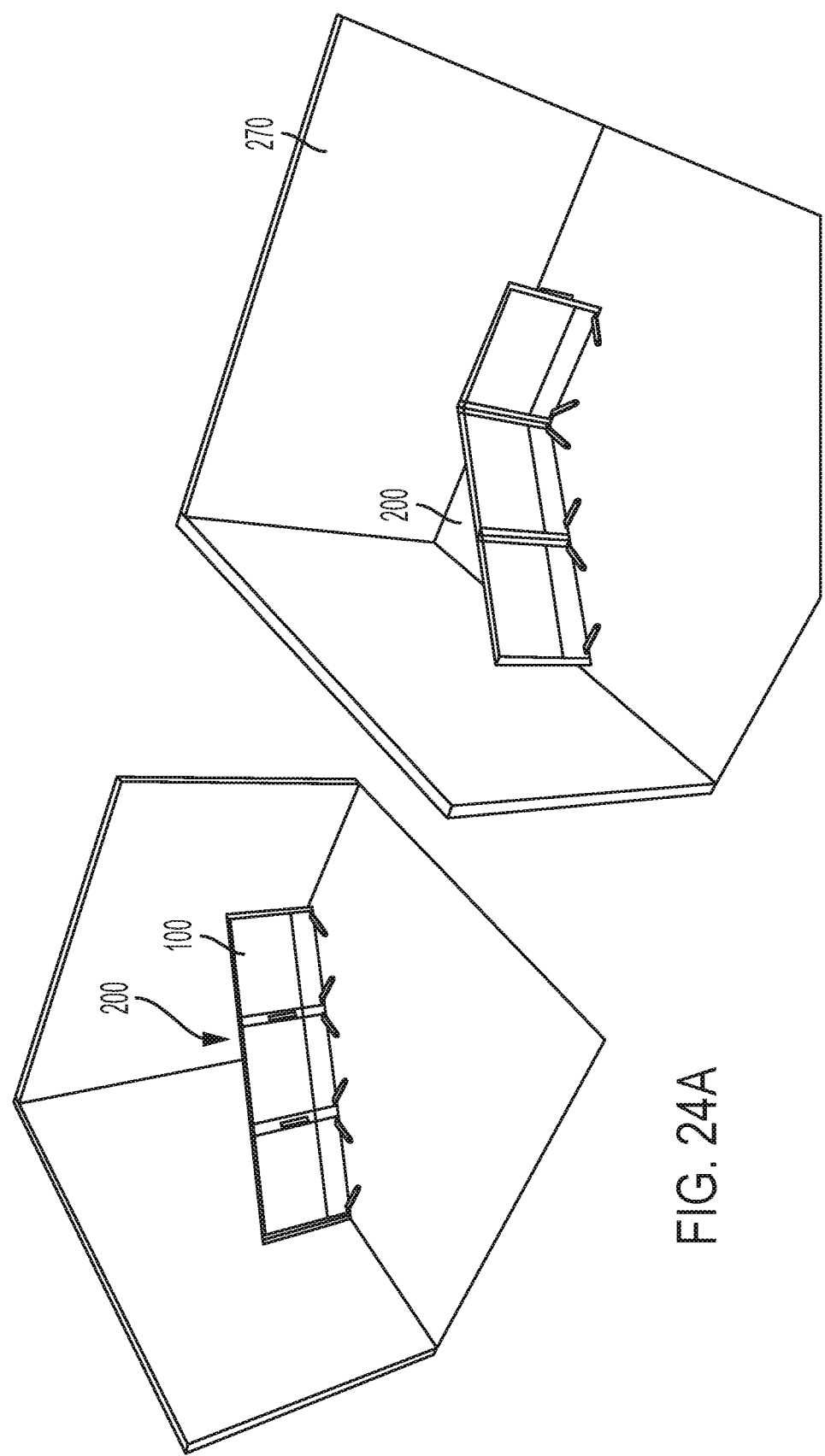
FIG. 24A is a perspective schematic view of a room showing a barrier using the hinged ballistic resistant panel of FIG. 1.
FIG. 24B is another perspective schematic view of the room showing one panel of the barrier positioned to provide a path to a secure space behind the barrier.
Figures 26A, 26B:
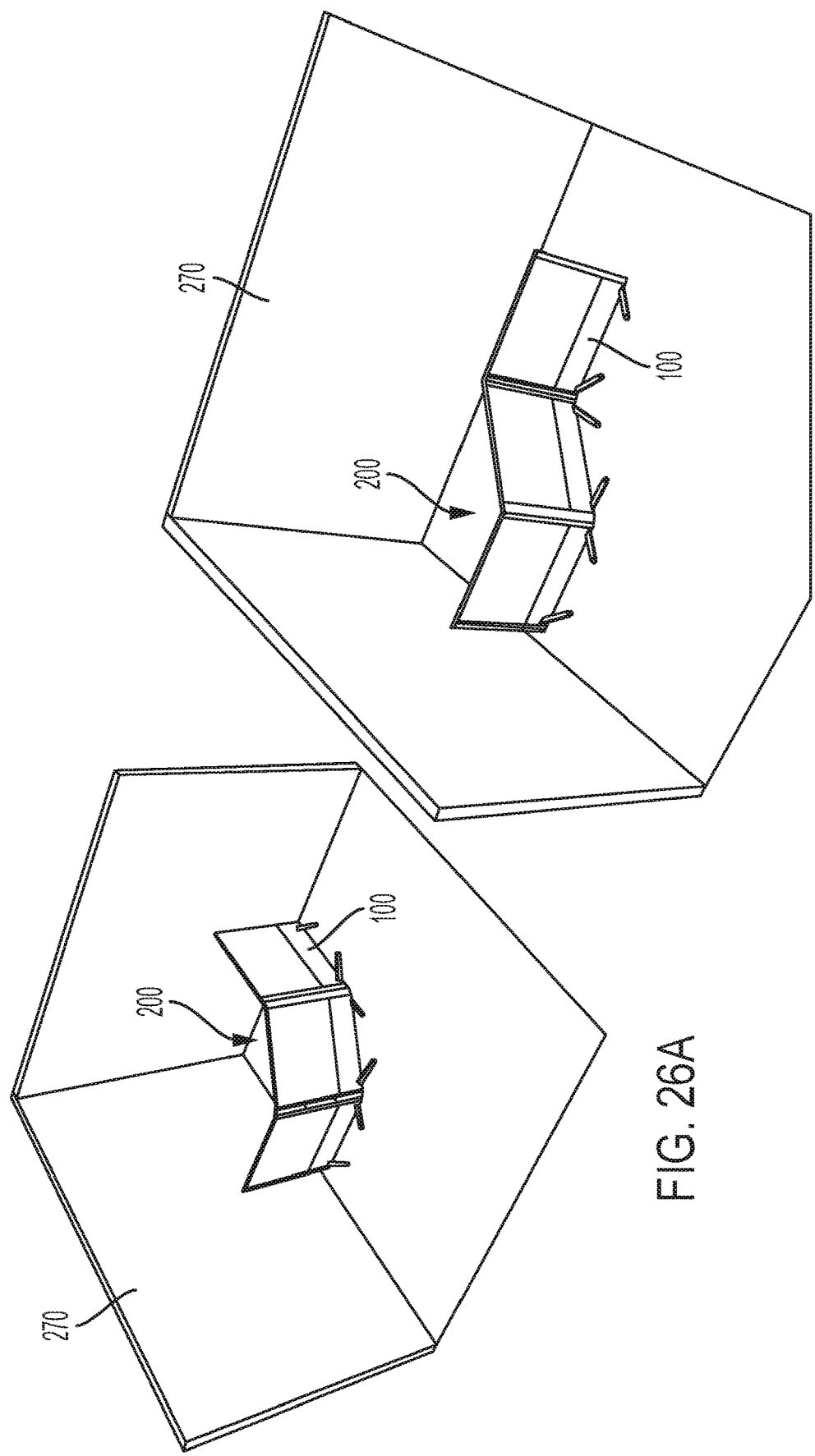
FIG. 26A is a perspective schematic view of a room showing a barrier using the hinged ballistic resistant panel of FIG. 1.
FIG. 26B is another perspective schematic view of the room showing one panel of the barrier positioned to provide a path to a secure space behind the barrier.

FIGS. 24-26 show three additional, non-limiting examples of how barriers made of ballistic resistant panels may be configured. In each of the examples in FIGS. 24-26, three panels 100 are used to form protected spaces 200 between the panels and two walls 270. FIG. 24A shows a three panel 100 barrier in a first position where all three panels are positioned in a straight line. FIG. 24B shows the three panel 100 barrier of FIG. 24A in a second position, wherein one panel is pulled away from one wall to provide a pathway behind the barrier. FIG. 25A shows a three panel 100 barrier in a first position where two panels are positioned in a straight line, and a third panel is at a 90 degree angle from the other two panels. FIG. 25B shows the three panel 100 barrier of FIG. 25A in a second position, wherein one panel is pulled away from one wall to provide a pathway behind the barrier. Finally, FIG. 26A shows yet another three panel 100 barrier in a first position, where the panels are non-parallel and non-perpendicular to each other. The configuration in FIG. 26A maximizes the amount of protected space 200 available behind a three panel 100 barrier. FIG. 26B shows the three panel 100 barrier of FIG. 26A in a second position, wherein one panel is pulled away from one wall to provide a pathway behind the barrier.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A ballistic resistant panel comprising:
   a section of ballistic resistant material;
   a hollow upper leaf attached to a first end of the panel;
   a first hinge pin disposed at least partly within the upper leaf, and selectively movable between a retracted position and an extended position;
   a hollow middle leaf attached to a second end of the panel;
   a second hinge pin disposed at least partly within the middle leaf, and selectively movable between a retracted position and an extended position; and
   a lower leaf attached to the first end of the panel, wherein the lower leaf is at least partially hollow and configured to accept at least a portion of a hinge pin from another ballistic resistant panel.

2. The ballistic resistant panel of claim 1, wherein the panel includes a plurality of legs.

3. The ballistic resistant panel of claim 2, wherein each leg is attached at a first end to the panel, and wherein a caster is attached to a second end of each leg.

4. The ballistic resistant panel of claim 3, wherein at least one of the casters is a locking caster.

5. The ballistic resistant panel of claim 1, wherein the panel includes a frame surrounding the section.

6. The ballistic resistant panel of claim 1, further including a ballistic resistant skirt positioned below the section to fill a gap between the section and a floor.

7. The ballistic resistant panel of claim 1, wherein the legs extend from the panel at a 45 degree angle.

8. The ballistic resistant panel of claim 1, wherein each of the upper and middle leaves include an outer frame forming an outer tube.

9. The ballistic resistant panel of claim 8, wherein the outer frame of each of the upper and middle leaves includes an L shaped slot.

10. The ballistic resistant panel of claim 9, further comprising a protrusion attached to each hinge pin, each protrusion passing through a respective L shaped slot, and by use of each protrusion, a user may move each hinge pin relative to the respective leaf between a retracted position and an extended position.

11. The ballistic resistant panel of claim 10, wherein each hinge pin includes a threaded hole, and wherein each protrusion includes a threaded portion that selectively engages the threaded hole.

12. The ballistic resistant panel of claim 1, wherein each hinge pin is made of ballistic resistant material.

13. The ballistic resistant panel of claim 1, wherein the first and second hinge pins may be selectively locked in a desired position.

14. A ballistic resistant panel comprising:
a section of ballistic resistant material;
a plurality of legs, each leg attached at a first end to the section;
a hollow first leaf attached to a first end of the section at a first predetermined height;
a first hinge pin disposed at least partly within the first leaf, and selectively movable between a retracted position and an extended position;
a hollow second leaf attached to a second end of the section at a second predetermined height, different than the first predetermined height, such that the top of the second leaf is just lower than the bottom of the first leaf and configured to accept at least a portion of a first hinge pin from another ballistic resistant panel when in its extended position;
a second hinge pin disposed at least partly within the middle leaf, and selectively movable between a retracted position and an extended position; and
a third leaf attached to the first end of the section, the third leaf being at least partially hollow and configured to accept at least a portion of a second hinge pin from another ballistic resistant panel when in its extended position.

15. The ballistic resistant panel of claim 14, further including a plurality of casters, one attached to a second end of each leg.

16. The ballistic resistant panel of claim 14, further including a ballistic resistant skirt positioned below the section to fill a gap between the section and a floor.

17. The ballistic resistant panel of claim 14, wherein each of the upper and middle leaves include an outer frame forming an outer tube.

18. The ballistic resistant panel of claim 17, wherein the outer frame of each of the upper and middle leaves includes an L shaped slot.

19. The ballistic resistant panel of claim 18, further comprising a protrusion attached to each hinge pin, each protrusion passing through a respective L shaped slot, and by use of each protrusion, a user may move each hinge pin relative to the respective leaf between a retracted position and an extended position.

20. The ballistic resistant panel of claim 19, wherein each hinge pin includes a threaded hole, and wherein each protrusion includes a threaded portion that selectively engages the threaded hole.

* * * * *